US011745733B2

(12) United States Patent
Tsuji et al.

(10) Patent No.: US 11,745,733 B2
(45) Date of Patent: Sep. 5, 2023

(54) TRAVEL CONTROL APPARATUS FOR VEHICLE, VEHICLE CONTROLLING METHOD AND COMPUTER PROGRAM THEREFOR

(71) Applicant: Mazda Motor Corporation, Hiroshima (JP)

(72) Inventors: Yuta Tsuji, Aki-gun (JP); Akira Funakubo, Aki-gun (JP); Koji Kagami, Aki-gun (JP); Hitoshi Fukuba, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 267 days.

(21) Appl. No.: 17/123,116

(22) Filed: Dec. 16, 2020

(65) Prior Publication Data

US 2021/0229658 A1  Jul. 29, 2021

(30) Foreign Application Priority Data

Jan. 27, 2020  (JP) .................................. 2020-010819
Jan. 27, 2020  (JP) .................................. 2020-010825

(51) Int. Cl.
*B60W 30/09*       (2012.01)
*B60W 30/095*      (2012.01)
*B60W 30/18*       (2012.01)
*B60W 40/06*       (2012.01)
*B60W 40/08*       (2012.01)

(52) U.S. Cl.
CPC ........ *B60W 30/09* (2013.01); *B60W 30/0956* (2013.01); *B60W 30/181* (2013.01); *B60W 40/06* (2013.01); *B60W 40/08* (2013.01); *B60W 2540/221* (2020.02)

(58) Field of Classification Search
None
See application file for complete search history.

(56) References Cited

U.S. PATENT DOCUMENTS

| 2013/0311043 A1 | 11/2013 | Kobana et al. | |
| 2015/0006012 A1* | 1/2015 | Kammel | B60W 50/14 701/23 |
| 2017/0088136 A1* | 3/2017 | Seo | B60W 30/16 |
| 2017/0113694 A1* | 4/2017 | Nakatsuka | B60W 50/12 |

(Continued)

FOREIGN PATENT DOCUMENTS

| DE | 102018203063 A1 * | 9/2019 | |
| JP | 5569602 B2 | 8/2014 | |

*Primary Examiner* — Anne Marie Antonucci
*Assistant Examiner* — Amelia Vorce
(74) *Attorney, Agent, or Firm* — XSENSUS LLP

(57) ABSTRACT

A vehicle control apparatus includes circuitry for controlling a vehicle. The circuitry is configured to search for a stop location where the vehicle is to stop, on a basis of road shoulder region information, generate an evacuation path on a basis of road information to the stop location, and guide the vehicle to the stop location from a first travel lane adjacent to a road shoulder region. The circuitry is further configured to calculate a collision risk of collision with an on-road obstacle. When the collision risk is a predetermined degree or higher, the circuitry is to interrupt the guidance, otherwise the circuitry is to guide the vehicle to enter the stop location and stop the vehicle at the stop location.

18 Claims, 24 Drawing Sheets

(56) References Cited

U.S. PATENT DOCUMENTS

| | | | |
|---|---|---|---|
| 2018/0211218 A1* | 7/2018 | Berdinis | G06Q 10/08345 |
| 2018/0362034 A1* | 12/2018 | Hirata | G08G 1/005 |
| 2019/0077401 A1* | 3/2019 | Katagiri | B60W 10/18 |
| 2019/0135291 A1* | 5/2019 | Sim | B60W 30/10 |
| 2019/0171206 A1* | 6/2019 | Abrams | B60W 40/02 |
| 2020/0028876 A1† | 1/2020 | Cohen | |
| 2020/0217789 A1† | 7/2020 | Muta | |
| 2020/0238975 A1* | 7/2020 | Mizuno | B60W 50/16 |
| 2020/0307638 A1* | 10/2020 | Tsuji | B60Q 1/46 |
| 2020/0310443 A1* | 10/2020 | Kwon | B60K 35/00 |
| 2020/0320114 A1† | 10/2020 | Sparrow | |
| 2021/0064029 A1* | 3/2021 | Tarakhovsky | B60W 60/0051 |

\* cited by examiner
† cited by third party

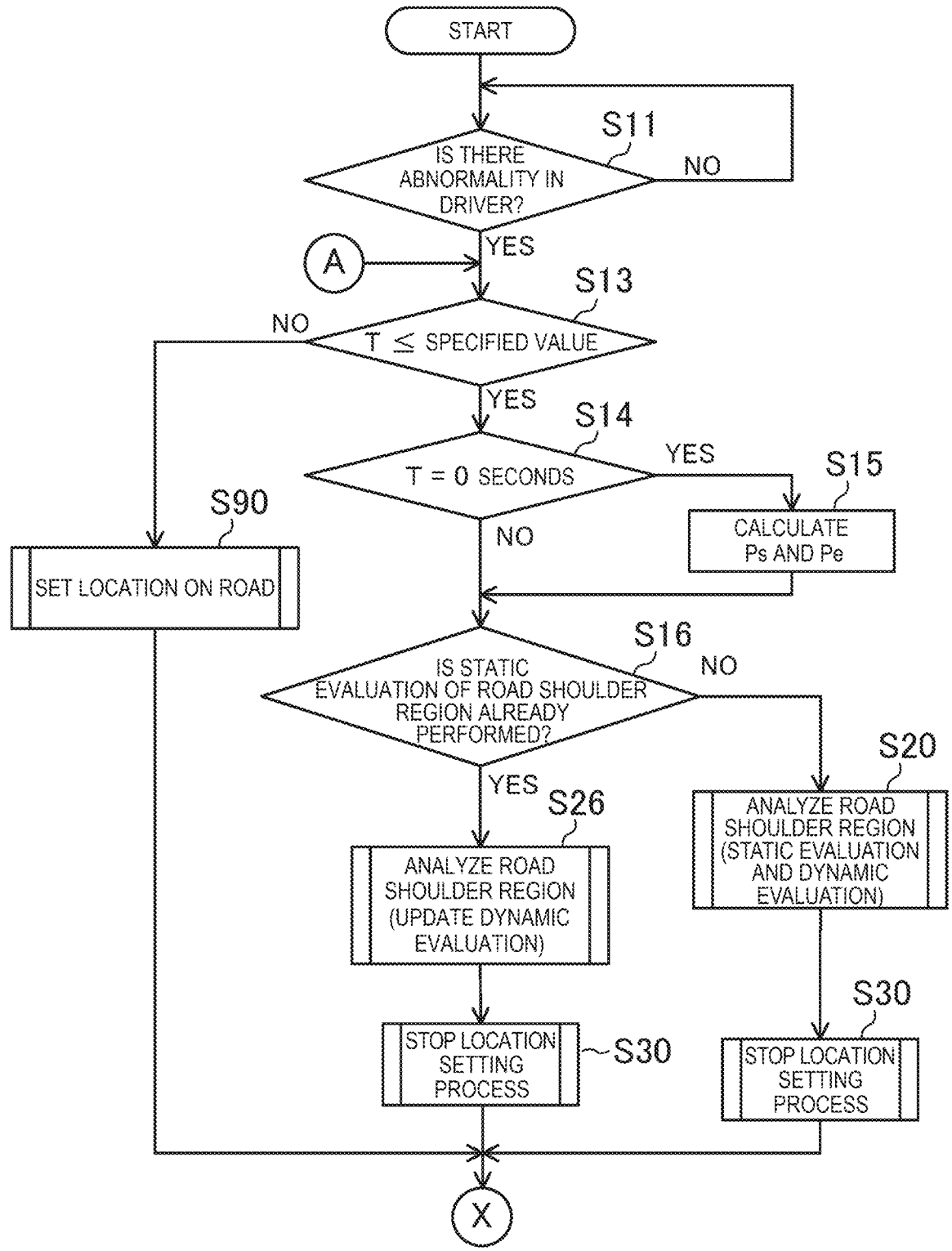

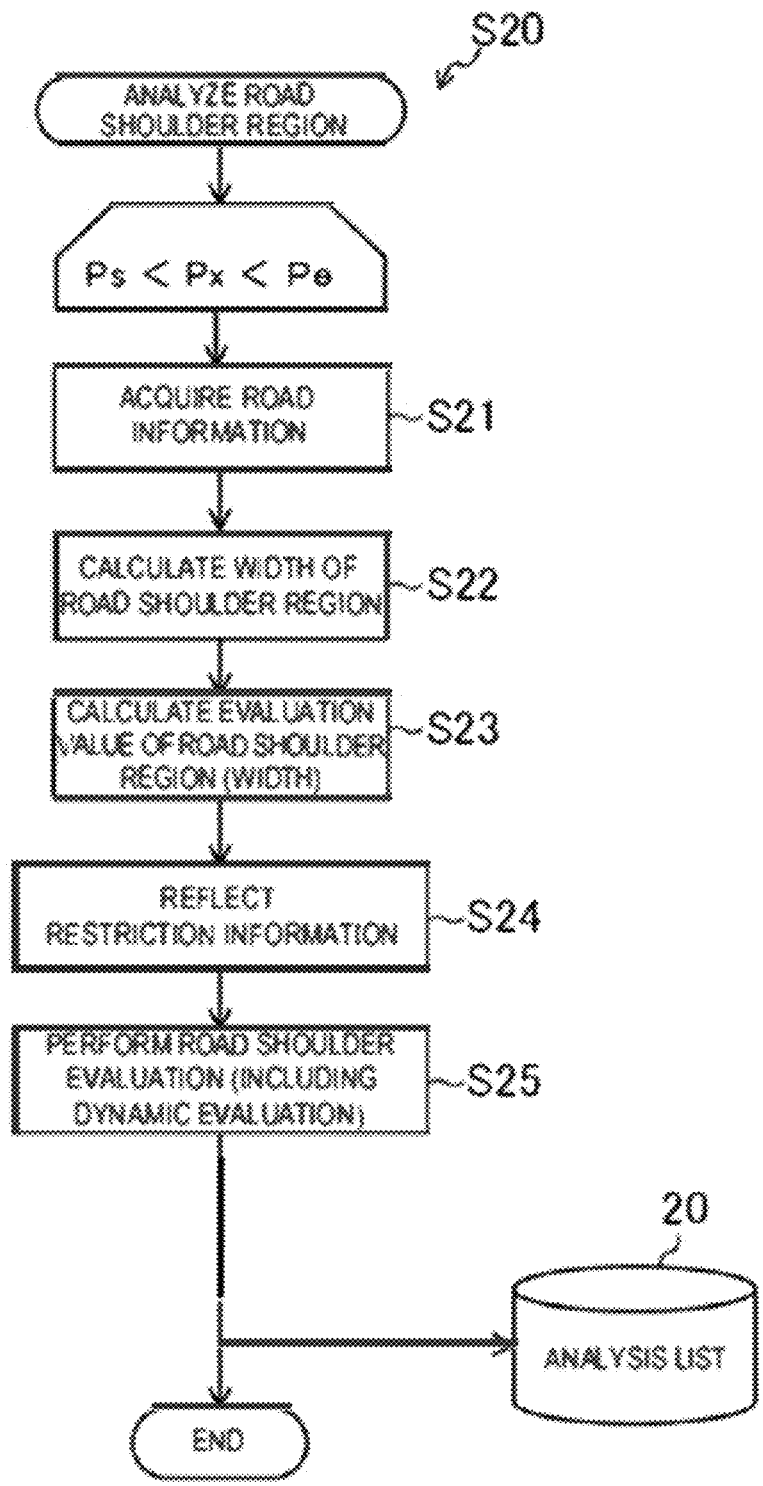

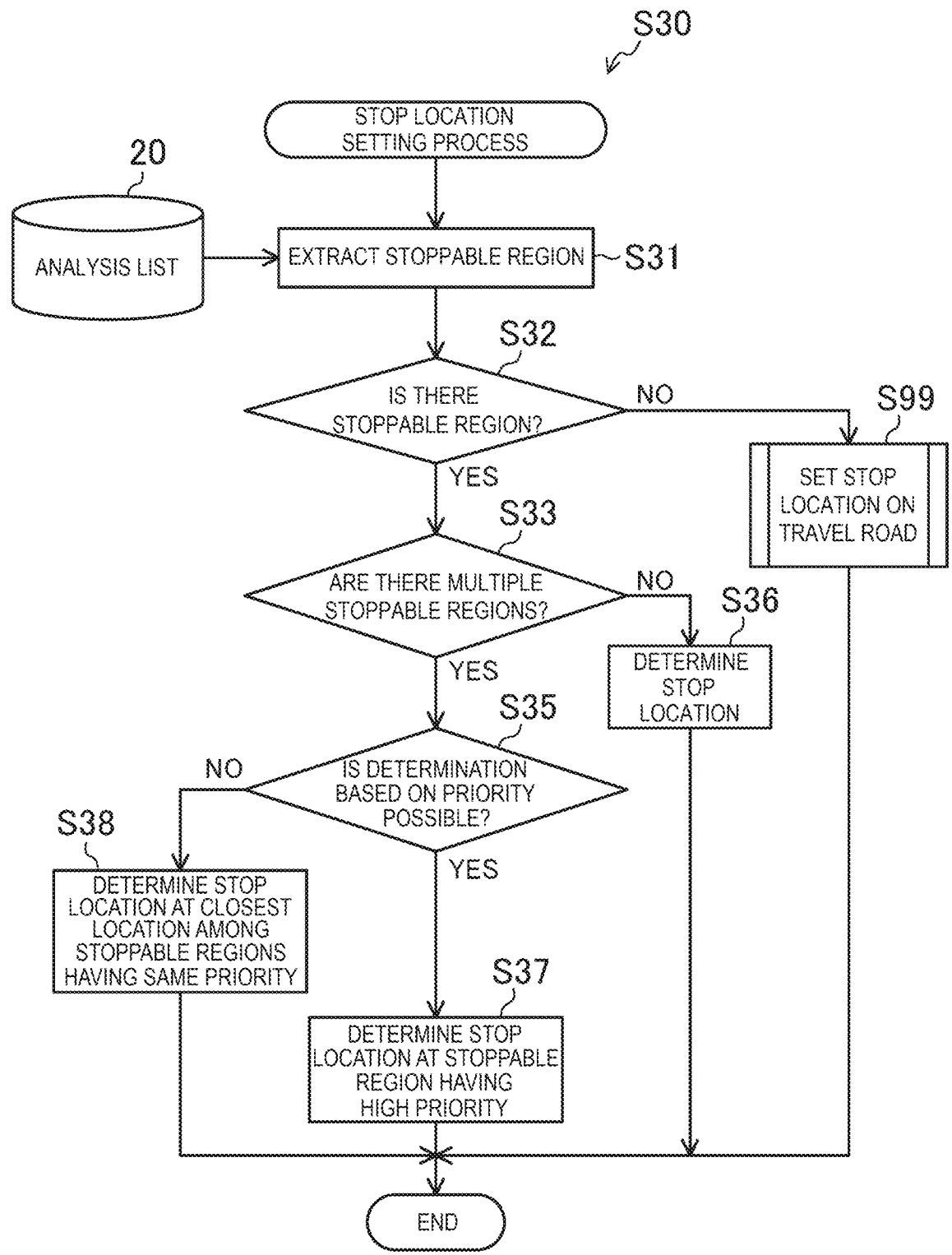

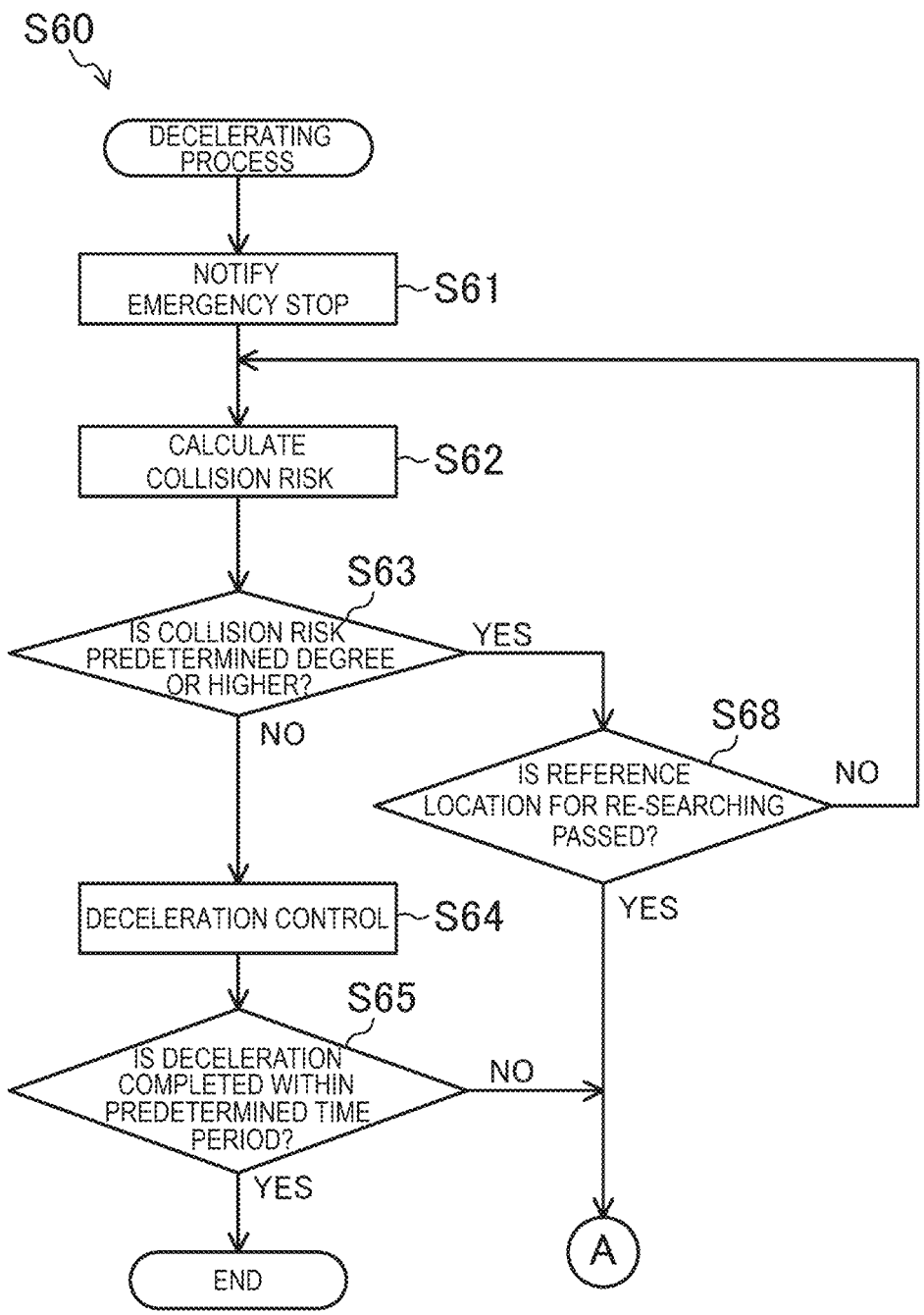

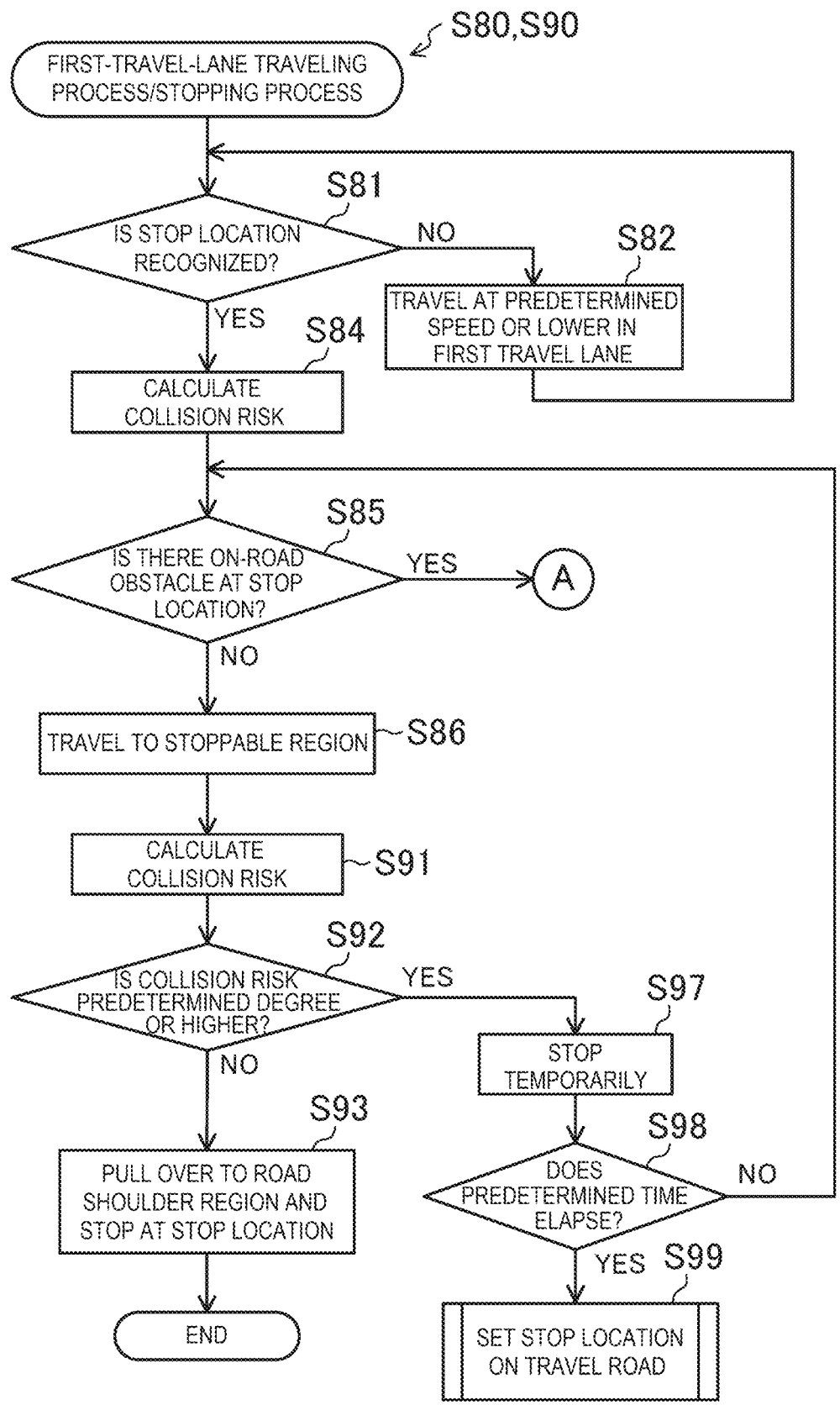

FIG. 5

| POINT P | TRAVEL LANE INFORMATION | | | SHAPE (STRAIGHT: A, GENTLE CURVE: B, SHARP CURVE: C) | ROAD SHOULDER REGION INFORMATION | | | | STATIC EVALUATION — EVALUATION OF ROAD SHOULDER WIDTH (A: WHOLE WIDTH + 0.5 meters OR MORE; B: WHOLE WIDTH + LESS THAN 0.5 meters; C: LESS THAN WHOLE WIDTH) | TRAFFIC RESTRICTION INFORMATION | | DYNAMIC EVALUATION | | ROAD SHOULDER EVALUATION |
| --- | --- | --- | --- | --- | --- | --- | --- | --- | --- | --- | --- | --- | --- | --- |
| | FIRST | SECOND | THIRD | | WIDTH | EXISTENCE OF ROAD SHOULDER (1: ROAD SHOULDER EXISTS; 0: NO ROAD SHOULDER EXISTS) | TYPE OF TRAFFIC LINE (1: ONE SOLID LINE; 0: OTHERS) | | | 5 meters OR MORE TO INTERSECTION (1: YES; 0: NO) | 5 meters OR MORE TO CROSSWALK (1: YES; 0: NO) | QUASI-MOVABLE BODY EVALUATION OBSTACLE (1: NO OBSTACLE EXISTS; 0: OBSTACLE EXISTS) | MOVABLE BODY EVALUATION OBSTACLE (1: NO OBSTACLE EXISTS; 0: OBSTACLE EXISTS) | |
| $P_1$ | 3.0 | 3.5 | 3.0 | A | 0.5m | 1 | 1 | | C | 1 | 1 | 1 | 1 | C |
| $P_2$ | 3.0 | 3.5 | 3.0 | A | 0.5m | 1 | 1 | | C | 1 | 1 | 1 | 0 | 0 |
| $P_3$ | 3.0 | 3.5 | 3.0 | A | 0.5m | 1 | 1 | | C | 1 | 1 | 1 | 0 | 0 |
| $P_4$ | 3.0 | 3.5 | 3.0 | A | 0.5m | 1 | 1 | | C | 1 | 1 | 0 | 0 | 0 |
| ... | ... | ... | ... | ... | ... | ... | ... | | ... | ... | ... | ... | ... | ... |
| $P_{k-2}$ | 3.0 | 3.5 | 3.0 | A | 1.8m | 1 | 1 | | B | 1 | 1 | 1 | 1 | B |
| $P_{k-1}$ | 3.0 | 3.5 | 3.0 | A | 2.5m | 1 | 1 | | A | 1 | 1 | 1 | 1 | A |
| $P_k$ | 3.0 | 3.5 | 3.0 | A | 2.5m | 1 | 1 | | A | 1 | 1 | 1 | 1 | A |
| ... | ... | ... | ... | ... | ... | ... | ... | | ... | ... | ... | ... | ... | ... |
| $P_{m-2}$ | 3.0 | 3.5 | 3.0 | A | 0.5m | 1 | 1 | | C | 1 | 1 | 1 | 1 | C |
| $P_{m-1}$ | 3.0 | 3.5 | 3.0 | A | 0.5m | 1 | 1 | | C | 1 | 1 | 1 | 1 | C |
| $P_m$ | 3.0 | 3.5 | 3.0 | A | 0.5m | 1 | 1 | | C | 1 | 1 | 1 | 1 | C |
| ... | ... | ... | ... | ... | ... | ... | ... | | ... | ... | ... | ... | ... | ... |
| $P_{n-2}$ | 3.0 | 3.5 | 3.0 | A | - | 0 | - | | 0 | 1 | 0 | 1 | 1 | 0 |
| $P_{n-1}$ | 3.0 | 3.5 | 3.0 | A | - | 0 | - | | 0 | 1 | 0 | 1 | 1 | 0 |
| $P_n$ | 3.0 | 3.5 | 3.0 | A | - | 0 | - | | 0 | 1 | 0 | 1 | 1 | 0 |

FIG. 7A

| POINT P | TRAVEL LANE INFORMATION | | | STATIC EVALUATION | | | | | | DYNAMIC EVALUATION | | ROAD SHOULDER EVALUATION |
|---|---|---|---|---|---|---|---|---|---|---|---|---|
| | FIRST | SECOND | THIRD | SHAPE (STRAIGHT:A, GENTLE CURVE:B, SHARP CURVE:C) | ROAD SHOULDER REGION INFORMATION | | | TRAFFIC RESTRICTION INFORMATION | | QUASI-MOVABLE BODY EVALUATION 1:NO OBSTACLE EXISTS 0:OBSTACLE EXISTS | MOVABLE BODY EVALUATION 1:NO OBSTACLE EXISTS 0:OBSTACLE EXISTS | |
| | | | | | WIDTH | EXISTENCE OF ROAD SHOULDER 1:ROAD SHOULDER EXISTS 0:NO ROAD SHOULDER EXISTS | TYPE OF TRAFFIC LINE 1:ONE SOLID LINE 0:OTHERS | EVALUATION OF ROAD SHOULDER WIDTH A:WHOLE WIDTH + 0.5 meters OR MORE B:WHOLE WIDTH + LESS THAN 0.5 meters C:LESS THAN WHOLE WIDTH | 5 meters OR MORE TO INTERSECTION 1:YES 0:NO | 5 meters OR MORE TO CROSSWALK 1:YES 0:NO | | | |
| Ps | 3.0 | 3.5 | 3.0 | A | 0.5m | 1 | 1 | C | 1 | 1 | 1 | 1 | C |
| ... | ... | ... | ... | ... | ... | ... | ... | ... | ... | ... | ... | ... | ... |
| | 3.0 | 3.5 | 3.0 | A | 0.5m | 1 | 1 | C | 1 | 1 | 1 | 1 | C ⎫ |
| | 3.0 | 3.5 | 3.0 | A | 0.5m | 1 | 1 | C | 1 | 1 | 1 | 1 | C ⎬ R21 |
| ... | ... | ... | ... | ... | ... | ... | ... | ... | ... | ... | ... | ... | ... |
| | 3.0 | 3.5 | 3.0 | A | 2.5m | 1 | 1 | A | 1 | 1 | 1 | 1 | A ⎫ |
| | 3.0 | 3.5 | 3.0 | A | 2.5m | 1 | 1 | A | 1 | 1 | 1 | 1 | A ⎬ R22 |
| | 3.0 | 3.5 | 3.0 | A | 2.5m | 1 | 1 | A | 1 | 1 | 1 | 1 | A |
| ... | ... | ... | ... | ... | ... | ... | ... | ... | ... | ... | ... | ... | ... |
| | 3.0 | 3.5 | 3.0 | A | 2.5m | 1 | 1 | A | 1 | 1 | 1 | 1 | A ⎫ |
| | 3.0 | 3.5 | 3.0 | A | 2.5m | 1 | 1 | A | 1 | 1 | 1 | 1 | A ⎬ R24 |
| | 3.0 | 3.5 | 3.0 | A | 2.5m | 1 | 1 | A | 1 | 1 | 1 | 1 | A |
| ... | ... | ... | ... | ... | ... | ... | ... | ... | ... | ... | ... | ... | ... |
| | 3.0 | 3.5 | 3.0 | A | 0.5m | 1 | 1 | C | 1 | 1 | 1 | 1 | C ⎫ |
| | 3.0 | 3.5 | 3.0 | A | 0.5m | 1 | 1 | C | 1 | 1 | 1 | 1 | C ⎬ R25 |
| | 3.0 | 3.5 | 3.0 | A | 0.5m | 1 | 1 | C | 1 | 1 | 1 | 1 | C |
| ... | ... | ... | ... | ... | ... | ... | ... | ... | ... | ... | ... | ... | ... |
| | 3.0 | 3.5 | 3.0 | A | — | 0 | 1 | 0 | 1 | 0 | 1 | 1 | 0 ⎫ |
| | 3.0 | 3.5 | 3.0 | A | — | 0 | 1 | 0 | 1 | 0 | 1 | 1 | 0 ⎬ RN |
| Pe | 3.0 | 3.5 | 3.0 | A | — | 0 | 1 | 0 | 1 | 0 | 1 | 1 | 0 |

FIG. 7B

| POINT | TRAVEL LANE INFORMATION | | | SHAPE STRAIGHT:A GENTLE CURVE:B SHARP CURVE:C | STATIC EVALUATION | | | | | TRAFFIC RESTRICTION INFORMATION | | DYNAMIC EVALUATION | | ROAD SHOULDER EVALUATION |
|---|---|---|---|---|---|---|---|---|---|---|---|---|---|---|
| | FIRST | SECOND | THIRD | | ROAD SHOULDER REGION INFORMATION | | | EVALUATION OF ROAD SHOULDER WIDTH A: WHOLE WIDTH + 0.5 meters OR MORE B: WHOLE WIDTH + LESS THAN 0.5 meters C: LESS THAN WHOLE WIDTH | | 5 meters OR MORE TO INTERSECTION 1:YES 0:NO | 5 meters OR MORE TO CROSSWALK 1:YES 0:NO | QUASI-MOVABLE BODY EVALUATION OBSTACLE 1:NO OBSTACLE EXISTS 0:OBSTACLE EXISTS | MOVABLE BODY EVALUATION OBSTACLE 1:NO OBSTACLE EXISTS 0:OBSTACLE EXISTS | |
| | | | | | WIDTH | EXISTENCE OF ROAD SHOULDER 1:ROAD SHOULDER EXISTS 0:NO ROAD SHOULDER EXISTS | TYPE OF TRAFFIC LINE 1:ONE SOLID LINE 0:OTHERS | | | | | | | |
| P₀ | ... | ... | ... | ... | ... | ... | ... | ... | ... | ... | ... | ... | ... | ... |
| | 3.0 | 3.5 | 3.0 | A | 2.5m | 1 | 1 | A | | 1 | 1 | 0 | 1 | ○ |
| | 3.0 | 3.5 | 3.0 | A | 2.5m | 1 | 1 | A | | 1 | 1 | 0 | 1 | ○ } R22 |
| | 3.0 | 3.5 | 3.0 | A | 2.5m | 1 | 1 | A | | 1 | 1 | 0 | 1 | ○ |
| | ... | ... | ... | ... | ... | ... | ... | ... | | ... | ... | ... | ... | ... |
| | 3.0 | 3.5 | 3.0 | A | 0.5m | 1 | 1 | C | | 1 | 1 | 1 | 1 | ○ |
| | 3.0 | 3.5 | 3.0 | A | 0.5m | 1 | 1 | C | | 1 | 1 | 1 | 1 | ○ } R23 |
| | 3.0 | 3.5 | 3.0 | A | 0.5m | 1 | 1 | C | | 1 | 1 | 1 | 1 | ○ |
| | ... | ... | ... | ... | ... | ... | ... | ... | | ... | ... | ... | ... | ... |
| | 3.0 | 3.5 | 3.0 | A | 2.5m | 1 | 1 | A | | 1 | 1 | 1 | 1 | △ |
| | 3.0 | 3.5 | 3.0 | A | 2.5m | 1 | 1 | A | | 1 | 1 | 1 | 1 | △ } R24 |
| | 3.0 | 3.5 | 3.0 | A | 2.5m | 1 | 1 | A | | 1 | 1 | 1 | 1 | △ |
| | ... | ... | ... | ... | ... | ... | ... | ... | | ... | ... | ... | ... | ... |
| | 3.0 | 3.5 | 3.0 | A | 0.5m | 1 | 1 | C | | 1 | 1 | 1 | 1 | ○ |
| | 3.0 | 3.5 | 3.0 | A | 0.5m | 1 | 1 | C | | 1 | 1 | 1 | 1 | ○ } R25 |
| | 3.0 | 3.5 | 3.0 | A | 0.5m | 1 | 1 | C | | 1 | 1 | 1 | 1 | ○ |
| | ... | ... | ... | ... | ... | ... | ... | ... | | ... | ... | ... | ... | ... |
| | 3.0 | 3.5 | 3.0 | A | - | 0 | 1 | 0 | | 1 | 0 | 1 | 1 | ○ |
| | 3.0 | 3.5 | 3.0 | A | - | 0 | 1 | 0 | | 1 | 0 | 1 | 1 | ○ } RN |
| Pₑ | 3.0 | 3.5 | 3.0 | A | - | 0 | 1 | 0 | | 1 | 0 | 1 | 1 | ○ |

FIG. 7C

| POINT P | TRAVEL LANE INFORMATION | | | | | STATIC EVALUATION | | | | | TRAFFIC RESTRICTION INFORMATION | | DYNAMIC EVALUATION | | ROAD SHOULDER EVALUATION |
|---|---|---|---|---|---|---|---|---|---|---|---|---|---|---|---|
| | FIRST | SECOND | THIRD | SHAPE (STRAIGHT: A, GENTLE CURVE: B, SHARP CURVE: C) | WIDTH | ROAD SHOULDER REGION INFORMATION | | | EVALUATION OF ROAD SHOULDER WIDTH (A: WHOLE WIDTH + 0.5 meters OR MORE, B: WHOLE WIDTH + LESS THAN 0.5 meters, C: LESS THAN WHOLE WIDTH) | | 5 meters OR MORE TO INTERSECTION 1:YES 0:NO | 5 meters OR MORE TO CROSSWALK 1:YES 0:NO | QUASI MOVABLE BODY OBSTACLE EVALUATION 1:NO OBSTACLE EXISTS 0:OBSTACLE EXISTS | MOVABLE BODY OBSTACLE EVALUATION 1:NO OBSTACLE EXISTS 0:OBSTACLE EXISTS | |
| | | | | | | EXISTENCE OF ROAD SHOULDER 1:ROAD SHOULDER EXISTS 0:NO ROAD SHOULDER EXISTS | TYPE OF TRAFFIC LINE 1:ONE SOLID LINE 0:OTHERS | | | | | | | | |
| ... | ... | ... | ... | ... | ... | ... | ... | ... | ... | ... | ... | ... | ... | ... | ... |
| | 3.0 | 3.5 | 3.0 | A | 2.5m | 1 | 1 | | A | | 1 | 1 | 1 | 1 | — } R22 |
| | 3.0 | 3.5 | 3.0 | A | 2.5m | 1 | 1 | | A | | 1 | 1 | 1 | 1 | — |
| | 3.0 | 3.5 | 3.0 | A | 2.5m | 1 | 1 | | A | | 1 | 1 | 1 | 1 | — |
| ... | ... | ... | ... | ... | ... | ... | ... | ... | ... | ... | ... | ... | ... | ... | ... |
| | 3.0 | 3.5 | 3.0 | A | 0.5m | 1 | 1 | | C | | 1 | 1 | 1 | 1 | ○ } R23 |
| | 3.0 | 3.5 | 3.0 | A | 0.5m | 1 | 1 | | C | | 1 | 1 | 1 | 1 | ○ |
| | 3.0 | 3.5 | 3.0 | A | 0.5m | 1 | 1 | | C | | 1 | 1 | 1 | 1 | ○ |
| ... | ... | ... | ... | ... | ... | ... | ... | ... | ... | ... | ... | ... | ... | ... | ... |
| | 3.0 | 3.5 | 3.0 | A | 2.5m | 1 | 1 | | A | | 1 | 1 | 1 | 1 | △ } R24 |
| | 3.0 | 3.5 | 3.0 | A | 2.5m | 1 | 1 | | A | | 1 | 1 | 1 | 1 | △ |
| | 3.0 | 3.5 | 3.0 | A | 2.5m | 1 | 1 | | A | | 1 | 1 | 1 | 1 | △ |
| ... | ... | ... | ... | ... | ... | ... | ... | ... | ... | ... | ... | ... | ... | ... | ... |
| | 3.0 | 3.5 | 3.0 | A | 0.5m | 1 | 1 | | C | | 1 | 1 | 1 | 1 | ○ } R25 |
| | 3.0 | 3.5 | 3.0 | A | 0.5m | 1 | 1 | | C | | 1 | 1 | 1 | 1 | ○ |
| | 3.0 | 3.5 | 3.0 | A | 0.5m | 1 | 1 | | C | | 1 | 1 | 1 | 1 | ○ |
| ... | ... | ... | ... | ... | ... | ... | ... | ... | ... | ... | ... | ... | ... | ... | ... |
| | 3.0 | 3.5 | — | A | — | 0 | — | | ○ | | 0 | 0 | 1 | 1 | ○ } RN |
| | 3.0 | 3.5 | — | A | — | 0 | — | | ○ | | 0 | 0 | 1 | 1 | ○ |
| $P_e$ | 3.0 | 3.5 | — | A | — | 0 | — | | ○ | | 0 | 0 | 1 | 1 | ○ |

FIG. 7D

| POINT P | TRAVEL LANE INFORMATION | | | SHAPE (STRAIGHT:A, GENTLE CURVE:B, SHARP CURVE:C) | WIDTH | ROAD SHOULDER REGION INFORMATION | | | TRAFFIC RESTRICTION INFORMATION | | DYNAMIC EVALUATION | | ROAD SHOULDER EVALUATION |
|---|---|---|---|---|---|---|---|---|---|---|---|---|---|
| | FIRST | SECOND | THIRD | | | EXISTENCE OF ROAD SHOULDER (1: ROAD SHOULDER EXISTS / 0: NO ROAD SHOULDER EXISTS) | TYPE OF TRAFFIC LINE (1: ONE SOLID LINE / 0: OTHERS) | EVALUATION OF ROAD SHOULDER WIDTH (A: WHOLE WIDTH + 0.5 meters OR MORE / B: WHOLE WIDTH + LESS THAN 0.5 meters / C: LESS THAN WHOLE WIDTH) | 5 meters OR MORE TO INTERSECTION (1:YES 0:NO) | 5 meters OR MORE TO CROSSWALK (1:YES 0:NO) | QUASI-MOVABLE BODY EVALUATION OBSTACLE (1: NO OBSTACLE EXISTS / 0: OBSTACLE EXISTS) | MOVABLE BODY EVALUATION OBSTACLE (1: NO OBSTACLE EXISTS / 0: OBSTACLE EXISTS) | |
| ... | ... | ... | ... | ... | ... | ... | ... | ... | ... | ... | ... | ... | ... |
| | 3.0 | 3.5 | 3.0 | A | 2.5m | 1 | 1 | A | 1 | 1 | 0 | 1 | O |
| | 3.0 | 3.5 | 3.0 | A | 2.5m | 1 | 1 | A | 1 | 1 | 0 | 1 | O |
| | 3.0 | 3.5 | 3.0 | A | 2.5m | 1 | 1 | A | 1 | 1 | 0 | 1 | O |
| ... | ... | ... | ... | ... | ... | ... | ... | ... | ... | ... | ... | ... | ... |
| | 3.0 | 3.5 | 3.0 | A | 0.5m | 1 | 1 | C | 1 | 1 | 1 | 1 | O |
| | 3.0 | 3.5 | 3.0 | A | 0.5m | 1 | 1 | C | 1 | 1 | 1 | 1 | O |
| | 3.0 | 3.5 | 3.0 | A | 0.5m | 1 | 1 | C | 1 | 1 | 1 | 1 | O |
| ... | ... | ... | ... | ... | ... | ... | ... | ... | ... | ... | ... | ... | ... |
| | 3.0 | 3.5 | 3.0 | A | - | 0 | - | 0 | 1 | 0 | 1 | 1 | O |
| | 3.0 | 3.5 | 3.0 | A | - | 0 | - | 0 | 0 | 0 | 1 | 1 | O |
| $P_e$ | 3.0 | 3.5 | 3.0 | A | - | 0 | - | 0 | 0 | 0 | 1 | 1 | O |

The three rows labeled with 2.5m correspond to bracket R24; the three rows with 0.5m correspond to R25; the final three rows correspond to RN. The columns from "TRAVEL LANE INFORMATION" through "TRAFFIC RESTRICTION INFORMATION" are grouped under STATIC EVALUATION.

FIG. 7E

| POINT P | TRAVEL LANE INFORMATION | | | | ROAD SHOULDER AREA INFORMATION | | | STATIC EVALUATION — ROAD SHOULDER EVALUATION (A: OVERALL WIDTH+0.5m↑; B: OVERALL WIDTH+0.5m↓; C: LESS THAN OVERALL WIDTH) | TRAFFIC RESTRICTION INFORMATION | | ... | MOBILE OBJECT EVALUATION | | ROAD SHOULDER EVALUATION | |
|---|---|---|---|---|---|---|---|---|---|---|---|---|---|---|---|
| | FIRST | SECOND | THIRD | SHAPE (straight A / gentle curve B / acute curve C) | WIDTH | PRESENCE/ABSENCE OF ROAD SHOULDER (1: present, 0: absent) | TYPE OF WHITE LINE (1: single solid, 0: other) | | 5m OR LONGER FROM INTERSECTION (1:YES 0:NO) | 5m OR LONGER FROM CROSSWALK (1:YES 0:NO) | | SEMI-MOBILE OBJECT EVALUATION – OBSTACLE (1:ABSENT 0:PRESENT) | MOBILE OBJECT EVALUATION – OBSTACLE (1:ABSENT 0:PRESENT) | | Group |
| ... | ... | ... | ... | ... | ... | ... | ... | ... | ... | ... | ... | ... | ... | ... | |
| | 3.0 | 3.5 | 3.0 | A | 2.5m | 1 | 1 | A | 1 | 1 | ... | 1 | 1 | 1 | R22 |
| | 3.0 | 3.5 | 3.0 | A | 2.5m | 1 | 1 | A | 1 | 1 | ... | 1 | 1 | 1 | R22 |
| | 3.0 | 3.5 | 3.0 | A | 2.5m | 1 | 1 | A | 1 | 1 | ... | 1 | 1 | 1 | R22 |
| | ... | ... | ... | ... | ... | ... | ... | ... | ... | ... | ... | ... | ... | ... | |
| | 3.0 | 3.5 | 3.0 | A | 0.5m | 1 | 1 | C | 1 | 1 | ... | 1 | 0 | 0 | R23 |
| | 3.0 | 3.5 | 3.0 | A | 0.5m | 1 | 1 | C | 1 | 1 | ... | 1 | 0 | 0 | R23 |
| | 3.0 | 3.5 | 3.0 | A | 0.5m | 1 | 1 | C | 1 | 1 | ... | 1 | 0 | 0 | R23 |
| | ... | ... | ... | ... | ... | ... | ... | ... | ... | ... | ... | ... | ... | ... | |
| | 3.0 | 3.5 | 3.0 | A | 2.5m | 1 | 1 | A | 1 | 1 | ... | 1 | 0 | 0 | R24 |
| | 3.0 | 3.5 | 3.0 | A | 2.5m | 1 | 1 | A | 1 | 1 | ... | 1 | 0 | 0 | R24 |
| | 3.0 | 3.5 | 3.0 | A | 2.5m | 1 | 1 | A | 1 | 1 | ... | 1 | 0 | 0 | R24 |
| | ... | ... | ... | ... | ... | ... | ... | ... | ... | ... | ... | ... | ... | ... | |
| | 3.0 | 3.5 | 3.0 | A | 0.5m | 1 | 1 | C | 1 | 1 | ... | 1 | 0 | 0 | R25 |
| | 3.0 | 3.5 | 3.0 | A | 0.5m | 1 | 1 | C | 1 | 1 | ... | 1 | 0 | 0 | R25 |
| | 3.0 | 3.5 | 3.0 | A | 0.5m | 1 | 1 | C | 1 | 1 | ... | 1 | 0 | 0 | R25 |
| | ... | ... | ... | ... | ... | ... | ... | ... | ... | ... | ... | ... | ... | ... | |
| | 3.0 | 3.5 | 3.0 | A | — | 0 | — | 0 | 0 | 0 | ... | 1 | 0 | 0 | RN |
| | 3.0 | 3.5 | 3.0 | A | — | 0 | — | 0 | 0 | 0 | ... | 1 | 0 | 0 | RN |
| Pₙ | 3.0 | 3.5 | 3.0 | A | — | 0 | — | 0 | 0 | 0 | ... | 1 | 0 | 0 | RN |

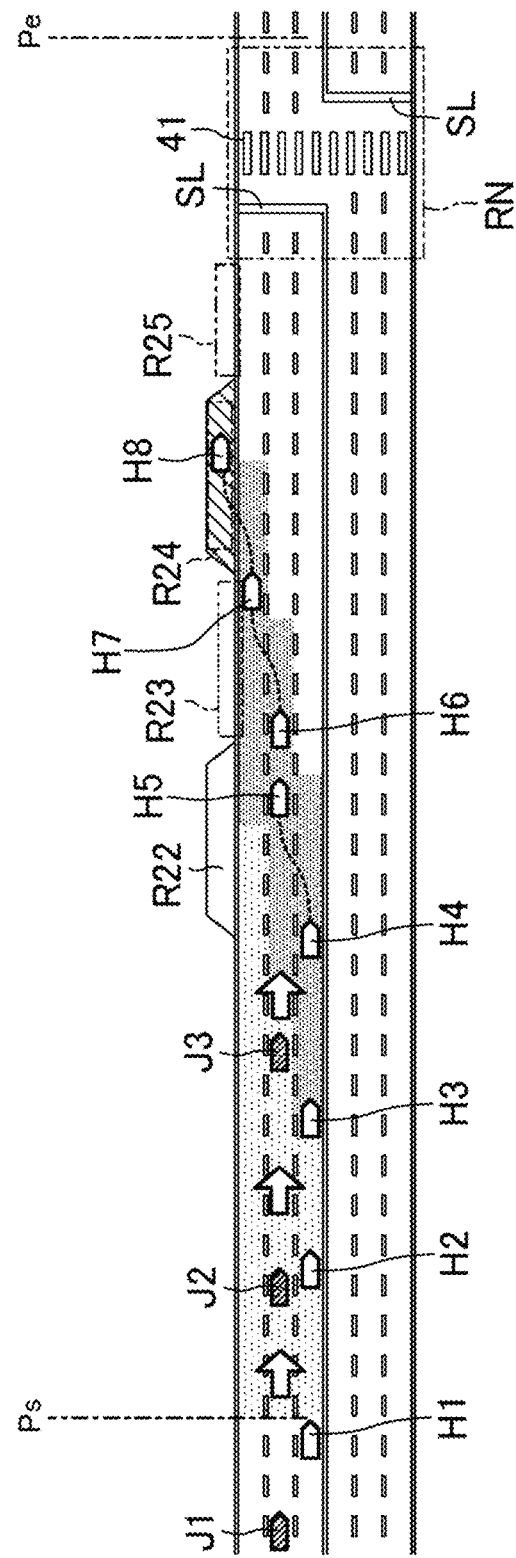

FIG. 12

| STOP LOCATION | FIRST RISK VALUE |
|---|---|
| PARKING SPACE | 1 |
| ROAD SHOULDER REGION | 1 TO 2 |
| FIRST TRAFFIC LANE | 5 |
| SECOND TRAFFIC LANE | 10 |
| THIRD TRAFFIC LANE | 30 |
| TRAFFIC RESTRICTION REGION | 60 |
| ... | ... |

FIG. 13

| MOVEMENT | SECOND RISK VALUE |
|---|---|
| TRAVEL IN SAME TRAVEL LANE (AT SAME SPEED) | 1 |
| TRAVEL IN SAME TRAVEL LANE (WHILE DECELERATING) | 1.5 |
| CHANGE LANE | 2 |
| PASS THROUGH CROSSWALK | 20 |
| ADVANCE STRAIGHTLY IN INTERSECTION | 30 |
| TURN LEFT AT INTERSECTION | 50 |
| ... | ... |

TRAVEL CONTROL APPARATUS FOR VEHICLE, VEHICLE CONTROLLING METHOD AND COMPUTER PROGRAM THEREFOR

CROSS REFERENCE TO RELATED APPLICATIONS

The present application contains subject matter related to Japanese Priority Application JP 2020-010819 filed in the Japanese Patent Office on Jan. 27, 2020 and JP 2020-010825 filed in the Japanese Patent Office on Jan. 27, 2020, the entire disclosures of each of which are incorporated herein by reference. The application also contains subject matter related to that described in U.S. application Ser. No. 17/120,290, claiming priority to JP 2020-010827; and U.S. application Ser. No. 17/120,292, claiming priority to JP 2020-010759; the entire contents of each of which being incorporated herein by reference in their entirety.

TECHNICAL FIELD

The technique disclosed herein belongs to a field of technology relating to travel control apparatuses for vehicles.

BACKGROUND ART

Travel control apparatuses for making a vehicle stop at as safe a place as possible are conventionally known. This operation is performed in the even that, for example, a driver becomes ill, or abnormality occurs in a control system of an automobile.

For example, Patent Document 1 discloses a vehicle control apparatus that includes an emergency stop unit for stopping a vehicle with no brake operation by a driver. This vehicle control apparatus makes a vehicle stop while changing a steering angle of the vehicle in accordance with circumstances around a location at which the vehicle is to stop, in a case in which deterioration of the condition of a driver is detected by a driver condition detector.

PRIOR ART DOCUMENTS

Patent Documents

[Patent document 1] Japanese Patent No. 5,569,602

SUMMARY OF THE DISCLOSURE

Problems to be Solved

However, the traffic situation around a vehicle changes every moment, and therefore, there are cases in which it is difficult to make the vehicle travel in accordance with a selected travel pattern or to make the vehicle stop at a set location. Moreover, in such cases, a new stop location may be searched for, but the time to make the vehicle stop tends to be prolonged in a situation in which the stop location is difficult to set due to traffic conditions or other cause.

The technique disclosed herein has been made in view of these points, and an object of this technique is to improve safety in bringing a vehicle to an emergency stop.

Means for Solving the Problems

To solve the above-described and other problems, the technique disclosed herein includes a travel control apparatus including a control section and a storage. The control section is configured to generate a target path to a target location on the basis of vehicle surrounding information that is obtained by an information obtaining part mounted on a vehicle and/or external thereto and is configured to control the vehicle so that the vehicle will follow the target path. The storage is configured to store road information containing road shoulder region information. The control section is further configured to, in making the vehicle automatically stop in a state in which the vehicle travels in a second travel lane that is separated from a road shoulder region more than a first travel lane adjacent to the road shoulder region, execute the following processes: a process of searching for a stop location where the vehicle is to stop, on the basis of the road shoulder region information, to set the target location at the stop location, and generating an evacuation path to the stop location as the target path; a process of decelerating the vehicle to a predetermined speed or lower; a process of making the vehicle change from the second travel lane to a free space of the first travel lane, on the basis of the vehicle surrounding information; and a process of making the vehicle travel at the predetermined speed or lower in the first travel lane and making the vehicle enter the stop location from the first travel lane and stop at the stop location. Meanwhile, a collision risk of collision with an obstacle on a road is calculated on the basis of vehicle surrounding information that is obtained by the information obtaining part. In a case in which the collision risk is a predetermined degree or higher in one of the processes, the corresponding process is interrupted, and the stop location is set in order to execute operation in the process subsequent to the interrupted process.

Thus, the process in which the collision risk of collision with an obstacle on a road is the predetermined degree or higher, is interrupted, and the stop location is set in order to execute the operation in the process subsequent to the interrupted process. This enables changing to a stop location and an evacuation path by the use of which an emergency stop is safely performed, before the collision risk is actualized due to change in traffic flow after the evacuation path to the emergency stop location is once set.

The control section may be configured to, in a case in which an abnormality in physical condition of a driver of the vehicle is detected, limit at least one of an elapsed time or a travel distance after the detection of the abnormality in physical condition, in accordance with the degree of the abnormality in physical condition; and set the stop location within the limitation.

This enables avoiding situations in which a long time is unexpectedly taken to automatically stop the vehicle and in which the vehicle cannot stop smoothly.

The control section may be configured to extract a region having a width and a length of the road shoulder region of predetermined reference values or greater as a stoppable region, on the basis of the road shoulder region information. In a case in which there are multiple stoppable regions, the control section may set priorities to the stoppable regions depending on area of the stoppable regions and may set a highly prioritized stoppable region as the stop location.

This enables traveling toward a safest stop location under predetermined restricted conditions. Moreover, when it is revealed that reaching the stop location safely is impracticable, a safe location is searched for successively, whereby a target stop location can be changed.

To solve the above-mentioned and other problems, the technique disclosed herein includes a travel control apparatus including a storage and a control section. The storage is configured to store road information relating to a road forward in an advancing direction of a vehicle. The control section is configured to perform an evacuation traveling control. The road information contains information relating to a width of a road shoulder region along a width direction end of the road. The control section is further configured to, in the evacuation traveling control, generate an evacuation path on which the vehicle is made to evacuate to the road shoulder region, on the basis of the road information stored in the storage, and further configured to control traveling of the vehicle in such a manner that the vehicle travels on the evacuation path. The control section is further configured to, during performing the evacuation traveling control, calculate a collision risk with respect to an on-road obstacle in the evacuation traveling control, on the basis of vehicle surrounding information that is obtained by an information obtaining part mounted on the vehicle. In a case in which the collision risk is a predetermined degree or higher, the control section interrupts the evacuation traveling control and makes the vehicle stop in a travel lane.

With this configuration, for example, in bringing a vehicle to an emergency stop, it is possible to appropriately determine whether to make the vehicle stop in a road shoulder region and whether to make the vehicle stop in a travel lane, in accordance with the degree of the collision risk. In addition, this configuration enables avoiding situations in which a long time is unexpectedly taken to automatically stop the vehicle and in which the vehicle cannot stop smoothly. That is, it is possible to avoid elongation of time to bring the vehicle to an emergency stop.

The control section may be configured to calculate the collision risk by multiplying a first risk value and a second risk value together. The first risk value may be set for a stop location candidate, and the second risk value may be set for movement of the vehicle until the vehicle reaches the stop location candidate.

With this configuration, the collision risk is concretely evaluated, whereby the collision risk is more appropriately determined.

In a case in which there are multiple travel lanes, the first risk value may be set lower for a travel lane relatively close to a road shoulder region than for a travel lane relatively distant from the road shoulder region.

A travel lane relatively close to a road shoulder region is separated from a median strip more than a travel lane relatively distant from the road shoulder region, and therefore, a possibility of coming into contact with a surrounding vehicle is low in the travel lane relatively close to a road shoulder region. In view of this, the collision risk with respect to other vehicle can be reduced.

The evacuation path may be generated in such a manner as to go to a road shoulder region existing before a location at which the vehicle reaches by traveling for a predetermined time or a predetermined distance in an advancing direction after the evacuation traveling control is started.

This enables specifying a maximum time or a maximum distance until the vehicle is brought to an emergency stop, for example, in bringing the vehicle to an emergency stop due to, e.g., a poor physical condition of a driver.

As described above, according to the technique disclosed herein, safety in bringing a vehicle to an emergency stop is improved. Moreover, it is possible to avoid elongation of time to bring the vehicle to an emergency stop.

BRIEF DESCRIPTION OF THE DRAWINGS

FIG. 2A is a flowchart showing an operation for setting an emergency stop location.

FIG. 2B is a flowchart showing a process of analyzing a road shoulder region.

FIG. 2C is a flowchart showing a processing operation of a stop location setting process.

FIG. 3B is a flowchart showing a processing operation of a decelerating process.

FIG. 3D is a flowchart showing processing operations of a first-travel-lane traveling process and a stopping process.

FIG. 5 is a diagram for explaining a process of setting an emergency stop location.

FIG. 7A shows an example of an analysis list generated in the travel scene in FIG. 6.

FIG. 7B shows an example of an analysis list generated in the travel scene in FIG. 8.

FIG. 7C shows an example of an analysis list generated in the travel scene in FIG. 9.

FIG. 7D shows an example of an analysis list generated in the travel scene in FIG. 10.

FIG. 7E shows an example of an analysis list generated in the travel scene in FIG. 11.

FIG. 9 is a schematic diagram showing another example of the travel scene of the vehicle that cannot stop at the first stop location candidate.

FIG. 12 is a table showing first risk values.

FIG. 13 is a table showing second risk values.

DETAILED DESCRIPTION

Hereinafter, an exemplary embodiment will be detailed with reference to the drawings. Note that, in the following descriptions, the forward travel side of a vehicle, which is an automobile in this embodiment, is simply referred to as a "front side", and the reveres travel side of the vehicle is simply referred to as a "rear side". In addition, the left side as viewed from the rear side to the front side is referred to as a "left side", and a side opposite to the left side is referred to as a "right side". The following descriptions assume that a vehicle travels in an area having left-hand traffic.

(Vehicle Control System)

Figure 1:
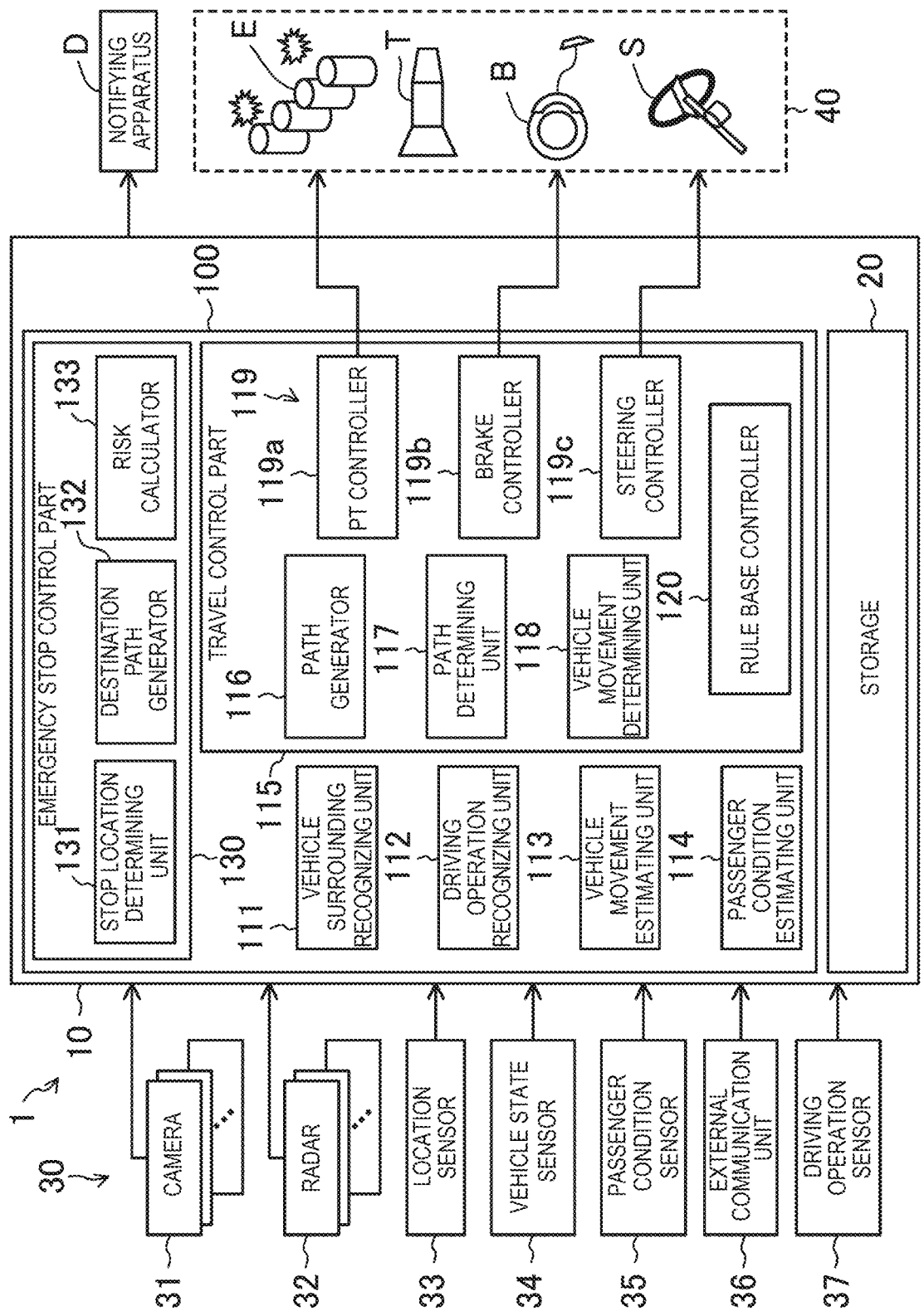
FIG. 1 is a block diagram schematically showing an example of a travel control apparatus.

FIG. 1 shows an example of a configuration of a vehicle control system 1 of an embodiment. The vehicle control system 1 is provided to a vehicle, and specifically, an automatic four-wheel vehicle. Driving operations of the vehicle can be switched among manual driving, assisted driving, and automated driving. The manual driving causes traveling in accordance with operation of a driver, for example, operation on an accelerator. The assisted driving causes traveling while operation of a driver is assisted. The automated driving causes traveling without operation of a driver. The vehicle control system 1 controls the vehicle in the assisted driving and in the automated driving. Specifically, the vehicle control system 1 controls operation, in particular, traveling, of the vehicle, by controlling an actuator 40 provided to the vehicle.

The vehicle control system 1 includes an information obtaining part 30 and a vehicle control apparatus 10. In the following descriptions, a vehicle that is provided with the vehicle control system 1 is referred to as an "own vehicle H", and other vehicle that exists around the own vehicle H is referred to as an "other vehicle J".

[Actuator]

The actuator 40 includes a drive system actuator, a steering system actuator, and a brake system actuator. Examples of the drive system actuator include an engine E, a transmission T, and a motor. An example of the brake system actuator includes a brake B. An example of the steering system actuator includes a steering S.

[Information Obtaining Part]

The information obtaining part 30 obtains various information to be used to control the vehicle. The information that is obtained by the information obtaining part 30 includes information of an obstacle on a road and vehicle surrounding information for generating a target path to a target location, which is a travel target of the vehicle. In this example, the information obtaining part 30 includes multiple cameras 31, multiple radars 32, a location sensor 33, a vehicle state sensor 34, a passenger condition sensor 35, an external communication unit 36, and a driving operation sensor 37.

<Camera>

The multiple cameras 31 have a mutually similar structure. The multiple cameras 31 are provided to the vehicle in such a manner as to surround the vehicle. The multiple cameras 31 obtain image data that show vehicle surroundings, by photographing surroundings of the vehicle, including an on-road obstacle. These surroundings of the vehicle are referred to as "vehicle surroundings", hereinafter. The image data that is obtained by each of the multiple cameras 31 is transmitted to the vehicle control apparatus 10. The image data that is imaged by the camera 31 is an example of the vehicle surrounding information. Each camera 31 may have an image sensor that takes fixed and/or moving images in the visual spectrum and/or non-visual ranges such as infrared and ultraviolet.

In this example, the multiple cameras 31 are monocular cameras having a wide-angle lens. For example, the camera 31 uses a solid state image sensor, such as a charge coupled device (CCD) or a complementary metal-oxide-semiconductor (CMOS). The camera 31 may be a monocular camera having a narrow-angle lens or may be a stereoscopic camera having a wide-angle lens or a narrow-angle lens.

<Radar>

The multiple radars 32 have a mutually similar structure. The multiple radars 32 are provided to the vehicle in such a manner as to surround the vehicle. The multiple radars 32 detect vehicle surroundings. Specifically, the radar 32 detects vehicle surroundings by sending an electric wave to vehicle surroundings and receiving a reflected wave that is reflected back from the vehicle surroundings. The results of detection performed by the multiple radars 32 are transmitted to the vehicle control apparatus 10.

For example, the radar 32 may be a millimeter wave radar for transmitting a millimeter wave, a short-range radar, SRR, operating, for example, in the 20 GHz to 27 GHz range, a long range radar, LRR, operating, for example, in the 76 to 81 GHz range, a light detection and ranging (LiDAR) sensor for transmitting laser light, e.g., a laser beam having wavelengths in at least one of ultraviolet, visible, and near infrared spectrums, an infrared ray radar for transmitting an infrared ray, or an ultrasonic wave sensor for transmitting an ultrasonic wave. The result of detection performed by the radar 32 is an example of the vehicle surrounding information.

<Location Sensor>

The location sensor 33 measures a location of the vehicle, for example, in terms of latitude and longitude. For example, the location sensor 33 receives GPS information from a global positioning system and measures a location of the vehicle on the basis of the GPS information. The information of the location of the vehicle, which is obtained by the location sensor 33, is transmitted to the vehicle control apparatus 10. The location of the vehicle, which is measured by the location sensor 33, is an example of the vehicle surrounding information.

<Vehicle State Sensor>

The vehicle state sensor 34 measures the state of the vehicle, for example, in terms of speed, acceleration, and yaw rate. For example, the vehicle state sensor 34 includes a vehicle speed sensor for measuring speed of the vehicle, an acceleration sensor for measuring acceleration of the vehicle, and a yaw rate sensor for measuring a yaw rate of the vehicle. The information of the state of the vehicle, which is obtained by the vehicle state sensor 34, is transmitted to the vehicle control apparatus 10.

<Passenger Condition Sensor>

The passenger condition sensor 35 measures condition of a driver who is driving the vehicle, for example, in terms of body motion or biological information of the driver. The information of the condition of the driver, which is obtained by the passenger condition sensor 35, is transmitted to the vehicle control apparatus 10. For example, the passenger condition sensor 35 includes a vehicle interior camera and a biological information sensor. The vehicle interior camera is provided inside the vehicle. The vehicle interior camera obtains image data, including image data of eyeballs of a driver, by photographing an area containing the eyeballs of the driver. The image data that is obtained by the vehicle interior camera is transmitted to the vehicle control apparatus 10. For example, the vehicle interior camera is disposed in front of a driver, and a photographing area is set in such a manner as to contain the eyeballs of the driver. The vehicle interior camera may be provided to goggles (not shown) worn by a driver. The biological information sensor measures biological information of a driver, for example, in terms of perspiration state, heart rate, blood flow rate, or skin temperature.

<External Communication Unit>

The external communication unit 36 receives information through vehicle external network provided outside of the vehicle, for example, internet. For example, the external communication unit 36 receives communication information from other vehicle J around the own vehicle H, car navigation data from a navigation system (not shown), traffic information, and highly accurate map information. The information that is obtained by the external communication unit 36 is transmitted to the vehicle control apparatus 10.

The information that is obtained through the vehicle external network by the external communication unit 36, such as traffic information and highly accurate map information, is an example of the vehicle surrounding information.

<Driving Operation Sensor>

The driving operation sensor 37 measures driving operation performed on the vehicle. For example, the driving operation sensor 37 includes an acceleration opening sensor, a steering angle sensor, and a brake hydraulic sensor. The acceleration opening sensor measures an operated amount of an accelerator of the vehicle. The steering angle sensor measures a steered angle of a steering wheel of the vehicle. The brake hydraulic sensor measures an operated amount of a brake of the vehicle. The information of the driving operation of the vehicle, which is obtained by the driving operation sensor 37, is transmitted to the vehicle control apparatus 10.

[Vehicle Control Apparatus]

The vehicle control apparatus 10 includes a control section 100 and a storage 20. The vehicle control apparatus 10 is electrically connected to each component of the actuator 40 and of the vehicle control system 1, such as the information obtaining part 30 in this example. The vehicle control apparatus 10 controls each component of the actuator 40 and of the vehicle control system 1 on the basis of information that are obtained by each component of the vehicle control system 1.

In the assisted driving or in the automated driving, the vehicle control apparatus 10 determines a target path as a path on which the vehicle should travel, and the vehicle control apparatus 10 controls operation of the actuator 40 so that the vehicle will travel by following the target path. For example, the vehicle control apparatus 10 is composed of one or multiple electronic control units (ECUs). The electronic control unit may be composed of a single integrated circuit (IC) or may be composed of multiple ICs. In addition, a single core or a single die may be provided to an IC, or cooperated multiple cores or cooperated multiple dies may be provided to an IC. The core or the die may be composed of, for example, a CPU or a processor, and a memory that stores a program for operating the CPU, and information such as result of processing in the CPU. The memory is an example of the storage 20. The storage 20 will be specifically described later.

[Control Section]

The vehicle control apparatus 10 includes the control section 100. The control section 100 controls operation of the actuator 40 on the basis of various information that are obtained by the information obtaining part 30.

Figure 14:
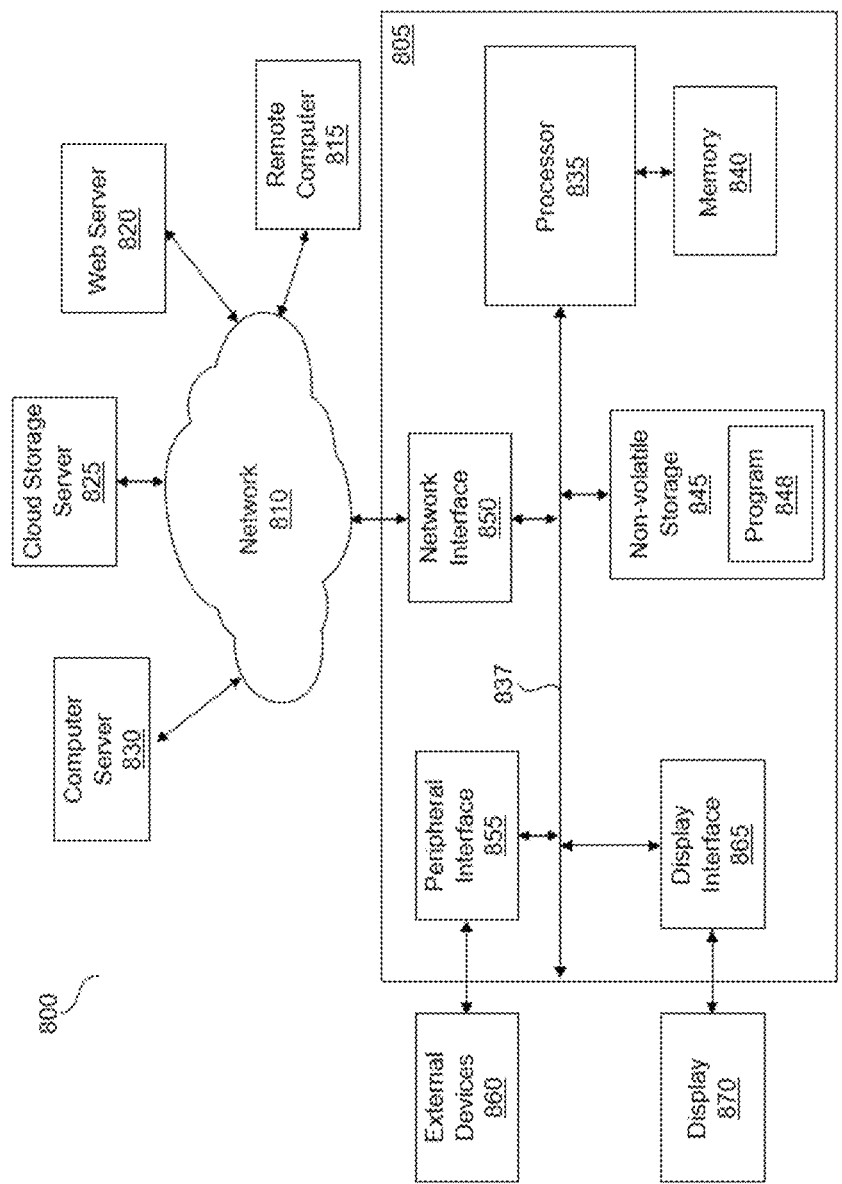
FIG. 14 is a block diagram of computer-based circuitry that may be used to implement control features of the present disclosure.

Optionally, the control section 100 may include a processor 835 and other circuitry in system 800 of FIG. 14, which may be implemented as a single processor-based system, or a distributed processor based system, including remote processing, such as cloud based processing.

In this example, the control section 100 monitors physical condition of a driver. The control section 100 performs normal traveling control until an abnormality in physical condition of a driver is detected, and the control section 100 stops the normal traveling control and starts evacuation traveling control in response to detection of an abnormality in physical condition of the driver. In the normal traveling control, the control section 100 selects a target path from multiple path candidates and controls operation of the actuator 40 so that the vehicle will travel on the target path. In the evacuation traveling control, the control section 100 generates an evacuation path for evacuating the vehicle to an emergency stop location that is set in a road shoulder region R, and the control section 100 controls operation of the actuator 40 so that the vehicle will travel on the evacuation path. The control section 100 makes the vehicle travel with no operation of the driver in the evacuation traveling control. That is, the evacuation traveling control is the automated driving. Note that the abnormal physical condition is a condition in which the driving ability of the driver is deteriorated due to illness and in which it is difficult for the driver to continue driving the vehicle. Examples of such an abnormality in physical condition include brain disease, such as a stroke, cardiac disease, such as cardiac infarction, epilepsy, and hypoglycemia. Herein, the road shoulder region R in this disclosure represents a region where a vehicle stop is allowed, in a belt-shaped road provided close to a road side along a vehicle travel road, such as a road shoulder or a side strip. The road shoulder region R includes a parking and stopping region for vehicles, which is provided by widening a part of a road so as to enable a vehicle to park and stop close to a road side of a travel road (for example, refer to a hatched area R11 in FIG. 4).

The control section 100 includes a vehicle surrounding recognizing unit 111, a driving operation recognizing unit 112, a vehicle movement estimating unit 113, a passenger condition estimating unit 114, a travel control part 115, and an emergency stop control part 130.

<Vehicle Surrounding Recognizing Unit>

The vehicle surrounding recognizing unit 111 recognizes surroundings of the vehicle on the basis of output of the multiple cameras 31, output of the multiple radars 32, output of the location sensor 33, output of the external communication unit 36, and output of the vehicle movement estimating unit 113. The vehicle surrounding recognizing unit 111 is an example of a vehicle surrounding recognizing means.

For example, the vehicle surrounding recognizing unit 111 generates vehicle surrounding information showing surroundings of the vehicle, from the above-described outputs, by using a learning model generated by deep learning. The deep learning uses a multilayer neural network or a deep neural network. An example of the multilayer neural network includes a convolutional neural network (CNN).

Specifically, the vehicle surrounding recognizing unit 111 performs image processing on an image that is obtained by the camera 31, to generate two-dimensional map data showing a region where the vehicle can move, such as a travel road. The vehicle surrounding recognizing unit 111 acquires object information relating to an object existing around the vehicle, on the basis of detection result of the radar 32 and/or the external communication section 36. The vehicle surrounding recognizing unit 111 recognizes an on-road obstacle from the object information. The on-road obstacle is an object that can be an obstacle in making the vehicle travel or stop, among objects existing around the vehicle. Examples of the object include a movable body that moves as time elapses and a static body that does not move irrespective of elapse of time. Examples of the movable body include an automatic four-wheel vehicle, a motorcycle, a bicycle, and a pedestrian. Examples of the static body include a sign, a roadside tree, a median strip, a center pole, and a building. The object information includes location coordinates of an object and a speed of an object. The vehicle surrounding recognizing unit 111 may acquire object information on the basis of an image obtained by the camera 31, the detection result of the radar 32, and/or the external communication section 36. The vehicle surrounding recognizing unit 111 integrates the two-dimensional map data and the object information to generate integrated map data or three-dimensional map data showing surroundings of the vehicle. The two-dimensional map data, the object information, and the integrated map data are examples of the vehicle surrounding information.

<Driving Operation Recognizing Unit>

The driving operation recognizing unit 112 recognizes driving operation performed on the vehicle, on the basis of output of the driving operation sensor 37. For example, the driving operation recognizing unit 112 generates data that shows driving operation performed on the vehicle, from output of the driving operation sensor 37, by using a learning model generated by deep learning.

<Vehicle Movement Estimating Unit>

The vehicle movement estimating unit 113 estimates movement of the vehicle on the basis of output of the vehicle state sensor 34, in terms of speed, acceleration, or yaw rate. For example, the vehicle movement estimating unit 113 generates data that shows movement of the vehicle, from output of the vehicle state sensor 34, by using a learning model generated by deep learning.

In one example, the learning model that is used by the vehicle movement estimating unit 113 is a vehicle six-axis model. The vehicle six-axis model is modeled acceleration in three-axis directions of a "front-rear direction", a "right-left direction, and an "up-down direction" of a vehicle that is traveling, and modeled angular velocity in three-axis directions of "pitch", "roll", and "yaw". That is, the vehicle six-axis model is a numerical model reproducing movement of a vehicle by using a total of six axes of pitching (Y-axis), rolling (X-axis), and vertical movement (Z-axis) of a vehicle body mounted on four wheels via suspensions, instead of using only a front-rear and right-left direction (X-Y movement) and yaw movement (Z-axis) of a vehicle in a plane in the field of classical vehicle dynamics engineering.

<Passenger Condition Estimating Unit>

The passenger condition estimating unit 114 estimates condition of a driver on the basis of output of the passenger condition sensor 35, for example, in terms of health status, feeling, or posture of the driver. For example, the passenger condition estimating unit 114 generates data that shows movement of a driver, from output of the passenger condition sensor 35, by using a learning model generated by deep learning. In this example, the passenger condition estimating unit 114 detects an abnormality in physical condition of a driver.

<Travel Control Part>

The travel control part 115 controls the actuator 40 on the basis of output of the vehicle surrounding recognizing unit 111, output of the driving operation recognizing unit 112, output of the vehicle movement estimating unit 113, and output of the passenger condition estimating unit 114. In this example, the travel control part 115 includes a path generator 116, a path determining unit 117, a vehicle movement determining unit 118, an actuator control part 119, and a rule base controller 120.

<<Path Generator>>

The path generator 116 generates, on the basis of output of the vehicle surrounding recognizing unit 111, one or multiple candidates for a path on which the vehicle travels to a target location. The target location is a travel target of the vehicle. The path candidate is a candidate for a target path on which the vehicle can travel. The path candidate includes, for example, a travel path for avoiding an on-road obstacle that is recognized by the vehicle surrounding recognizing unit 111.

For example, the path generator 116 generates a path candidate by using a state lattice method. The path generator 116 may set a grid region composed of a lot of grid points, on a travel road that is recognized by the vehicle surrounding recognizing unit 111, and the path generator 116 then sets multiple travel paths by consecutively connecting multiple grid points in the advance direction of the vehicle. Moreover, the path generator 116 adds a path cost to each of the multiple travel paths. In one example, as safety of the vehicle on the travel path is higher, the path cost that is added to the travel path is lower. The path generator 116 selects one or multiple travel paths as path candidates from the multiple travel paths, on the basis of the path cost added to each of the multiple travel paths.

The target location includes a final target location and an intermediate target location. The final target location represents a final destination of the vehicle. The intermediate target location is set between the final target location and a current vehicle location, as necessary, in making the vehicle travel to the final target location. The intermediate target location is, for example, a target location representing a vehicle destination at a terminal end of the grid region, and the intermediate target location is updated appropriately during traveling.

In the evacuation traveling control in emergency, such as in a case of detecting an abnormality in physical condition of a driver, the path generator 116 searches for a stop location for bringing the vehicle to an emergency stop, sets the stop location as a target location, and generates an evacuation path to the stop location. Specific examples of the method of generating an evacuation path will be described later.

<<Path Determining Unit>>

On the basis of at least one of output of the vehicle surrounding recognizing unit 111, output of the driving operation recognizing unit 112, or output of the passenger condition estimating unit 114, the path determining unit 117 selects a path candidate as a target path from one or multiple path candidates generated by each of the path generator 116, the rule base controller 120, and the emergency stop control part 130. In one example, the path determining unit 117 selects a path candidate that is supposed to be the most comfortable for a driver, from multiple path candidates, in a normal traveling condition in which the driver is in the normal condition.

For example, the path determining unit 117 selects the path candidate that is generated by the path generator 116 as a target path, more preferentially than the path candidate that is generated by the rule base controller 120, under the normal traveling control in the normal traveling condition. The path determining unit 117 may select the path candidate generated by the rule base controller 120, as a target path, in a case in which the path candidate generated by the path generator 116 greatly deviates from the path candidate generated by the rule base controller 120, under the normal traveling control. In one example, in a case in which the travel path generated by the path generator 116 does not pass a free space that is searched for by the rule base controller 120, the path determining unit 117 may determine the path candidate generated by the path generator 116, as greatly deviating from the path candidate generated by the rule base controller 120. Herein, the free space is a region with no obstacle, among a travel road and a road shoulder region contained in vehicle surroundings. The obstacle includes a dynamic obstacle and a static obstacle. Examples of the dynamic obstacle include other vehicle and a pedestrian. Examples of the static obstacle include a median strip and a center pole. Note that a free space in a travel road may be referred to as a "travel road free space" in the following descriptions.

In the evacuation traveling control in emergency, such as in a case of detecting an abnormality in physical condition of a driver, the path determining unit 117 selects the evacuation path generated by the path generator 116, as a target path.

<<Vehicle Movement Determining Unit>>

The vehicle movement determining unit 118 determines target movement on the basis of the path candidate that is selected as the target path by the path determining unit 117. The target movement is a movement necessary for the vehicle to travel by following the target path. In this example, the vehicle movement determining unit 118 derives each of a driving force, a braking force, and a steering amount for achieving the target movement, as a target driving force, a target braking force, and a target steering amount. For example, the vehicle movement determining unit 118 calculates movement of the vehicle on the target path on the basis of the vehicle six-axis model and then determines a target movement on the basis of the calculation result.

<<Actuator Control Part>>

The actuator control part 119 controls the actuator 40 on the basis of the target movement determined by the vehicle movement determining unit 118. In this example, the actuator control part 119 includes a powertrain (PT) controller 119a, a brake controller 119b, and a steering controller 119c. The PT controller 119a transmits a driving command value showing the target driving force, to the drive system actuator. The brake controller 119b transmits a braking command value showing the target braking force, to the brake system actuator. The steering controller 119c transmits a steering command value showing the target steering amount, to the steering system actuator.

<Rule Base Controller>

The rule base controller 120 performs processing by using an algorithm that is based on a predetermined rule, instead of using a learning model generated by deep learning.

Specifically, the rule base controller 120 recognizes surroundings of the vehicle on the basis of output of the information obtaining part 30 and searches for a travel road free space on the basis of the recognized surroundings of the vehicle. For example, the rule base controller 120 searches for a travel road free space on the basis of a preliminarily set searching rule. The searching rule may include a rule for setting a predetermined range around an object, for example, a range of several meters, as an unavoidable range. The rule base controller 120 may search for a travel road free space in consideration of a moving speed of a movable body, in the case in which the object is a movable body.

The rule base controller 120 then generates a path candidate that passes the travel road free space, that is, a path candidate that avoids an obstacle. The path candidate that is generated by the rule base controller 120, that is, the path candidate that passes the free space, is used by the path determining unit 117 of the travel control part 115.

<Emergency Stop Control Part>

The emergency stop control part 130 performs control for making the vehicle automatically travel to an emergency stop location and bringing the vehicle to an emergency stop thereat with no operation of a driver in emergency, for example, in a case of detecting an abnormality in the driver by the passenger condition estimating unit 114. Specifically, the emergency stop control part 130 includes a stop location determining unit 131, a destination path generator 132, and a risk calculator 133.

The emergency stop control part 130 automatically operates whichever of the manual driving mode, the assisted driving mode, and the automated driving mode the current driving mode is, in the case of detecting an abnormality in a driver.

FIGS. 2A to 2C and 3A to 3D are flowcharts showing examples of processing performed by the emergency stop control part 130. Functions of each component of the emergency stop control part 130 will be described with reference to these drawings. Note that, for convenience of explanation, FIGS. 2A to 2C are collectively represented as "FIG. 2", and FIGS. 3A to 3D are collectively represented as FIG. 3, depending on cases.

<<Stop Location Determining Unit>>

The stop location determining unit 131 analyzes a road shoulder region and sets an emergency stop location on the basis of the analysis result of the road shoulder region, in response to detection of an abnormality in a driver by the passenger condition estimating unit 114. The emergency stop location is an example of the final target location.

Emergency stop control in FIG. 2 is activated in response to detection of an abnormality in a driver. That is, the processing waits in step S11 in FIG. 2A until an abnormality in a driver is detected.

In FIG. 2A, in response to detection of an abnormality in the driver, the determination results in YES in step S11. In the next steps S13 and S14, the symbol "T" represents elapse of time after the abnormality in the driver is detected, and the point of time when the abnormality in the driver is detected is represented as "T=0". In these conditions, in the initial operation after detection of the abnormality in the driver, the determinations result in YES in steps S13 and S14, and the control flow advances to the next step S15.

In step S15, the stop location determining unit 131 stets a candidate detection area for detecting an evacuation space. Specifically, the stop location determining unit 131 sets a start point Ps and an end point Pe of the candidate detection area for detecting an evacuation space.

The method of setting the start point Ps is not specifically limited. However, for example, the stop location determining unit 131 sets a point by which it is possible to decelerate the vehicle speed of the own vehicle H to a predetermined speed or lower, as the start point Ps. More specifically, the start point Ps is set, for example, at a point to be reached by the own vehicle H after the own vehicle H is decelerated to a predetermined vehicle speed or lower, e.g., 10 km/h, and travels at the decelerated speed for a predetermined time period, e.g., 3 seconds, in response to detection of an abnormality in the driver.

Figure 4:
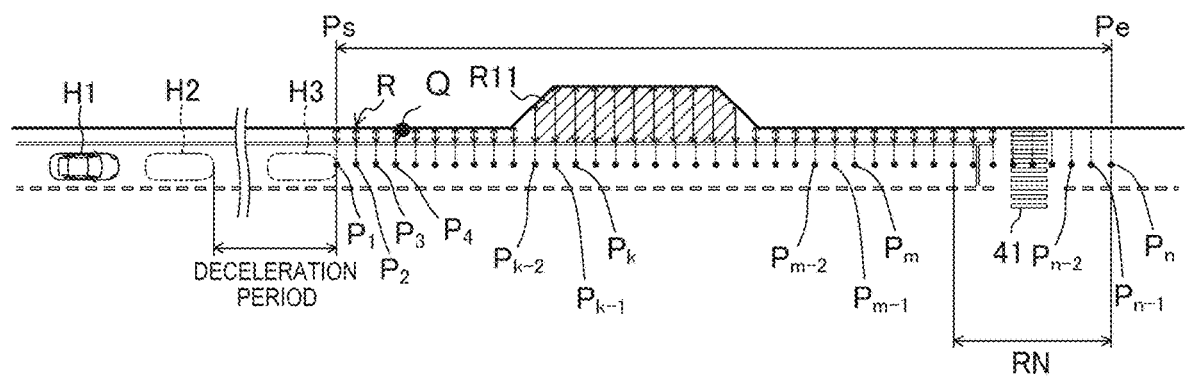
FIG. 4 is a diagram for explaining a process of analyzing a road shoulder region.

FIG. 4 shows an example of setting the start point Ps and the end point Pe. Specifically, FIG. 4 shows an example of setting the start point Ps at a location H3. In this example, an abnormality of a driver is detected at a location H1 of the own vehicle H, which is represented by solid lines, deceleration starts at a location H2, and the vehicle is expected to decelerate to the predetermined speed and to travel for the predetermined time period until reaching the location H3. Note that, in this embodiment, for easiness of explanation about elapse of time, the symbol H of the own vehicle is suffixed with a symbol, "1", "2", "3", and so on, representing the time order, and the location of the own vehicle H is represented as a "location H1", a "location H2", a "location H3", and so on. That is, the locations H1, H2, H3, and so on, show the transition of the location of the own vehicle H with elapse of time. The same applies to other vehicle J. Similarly, in other drawings, the transition of the location of the vehicle with elapse of time is shown by suffixing a numerical value to each of the symbols H and J of the vehicles, depending on cases.

The method of setting the end point Pe is not specifically limited. However, for example, the end point Pe is set at a point where the vehicle reaches after traveling at a predetermined vehicle speed, e.g., 10 km/h, for a predetermined time period, from the start point Ps. The method of setting the predetermined time period is not specifically limited, but, for example, it is set in accordance with the travel scene. Specifically, the end point Pe is set, e.g., at a point where the vehicle travels for 60 seconds from the start point Ps on an ordinary road, or at a point where the vehicle travels for 180 seconds from the start point Ps on an expressway. In addition, the end point Pe may be set in such a manner as to have a margin for an actual time limit.

This determination of the end point Pe of the candidate detection area defines the location before which the vehicle will be stopped, whereby it is possible to avoid situations in which a long time is unexpectedly taken to automatically stop the vehicle and in which the vehicle cannot stop smoothly. The method of determining the end point Pe by the stop location determining unit 131 is not specifically limited. For example, the distance or the travel time to the end point Pe may be a fixed value, or the value may be changed depending on type, severity, and urgency, of the abnormality of the physical condition of the driver.

After the stop location determining unit 131 sets the start point Ps and the end point Pe in step S15, whether the static evaluation finishes, is determined in the next step S16. The static evaluation will be described later. At this time, an emergency stop location is not yet set, whereby the determination results in NO, and the control flow advances to analysis of a road shoulder region in step S20.

—Analysis of Road Shoulder Region—

FIG. 2B is a flowchart showing an example of a process of analyzing a road shoulder region in step S20. In this embodiment, an example of generating an analysis list L1 in FIG. 5 based on the travel scene in FIG. 4 and an example of generating an analysis list L2 in FIG. 7A based on the travel scene in FIG. 6 will be described. These analysis lists L1 and L2 are results of analysis of a road shoulder region based on the flow in FIG. 2B.

Note that a road shoulder region with a width having an evaluation value of "C", as described later, is omitted in FIG. 6. However, as in the case in FIG. 4, a road shoulder region R with a width having an evaluation value of "A" to "C", extending along a first travel lane, is provided on the own vehicle H side of a stop line SL in FIG. 6. The same applies to FIGS. 8, 10A, and 11, which will be described later. In addition, in the case of not distinguishing the analysis list L1 in FIG. 5 and the analysis list L2 in FIG. 7 from each other, each is simply described as an "analysis list L" in the following descriptions.

In step S21, the stop location determining unit 131 acquires road information of the candidate detection area between the points Ps and Pe. The road information includes information relating to the travel road, information for calculating the width of the road shoulder region, and information of traffic restrictions relating to traveling and stopping of the vehicle, such as traffic control information and road structure information. The information of traffic restrictions is referred to as "traffic restriction information", hereinafter. The road information is acquired through, for example, an external network or a GPS, via the external communication unit 36.

In step S22, the width of the road shoulder region is calculated. The calculation method is not specifically limited. However, for example, the stop location determining unit 131 calculates the width of the road shoulder region R on the basis of highly accurate map information, which is received via the external communication unit 36, as well as vehicle surrounding information, which is obtained by the information obtaining part 30. More specifically, for example, as shown in FIG. 4, the stop location determining unit 131 plots n-number (n is an integer of 2 or more) of points P1 to Pn at a predetermined interval between the start point Ps and the end point Pe at the center of the first travel lane in the highly accurate map information. The stop location determining unit 131 then calculates a distance from each of the points P1 to Pn to the road end by drawing a normal line, and the stop location determining unit 131 subtracts a half width of the travel lane from the length of each of the normal lines and sets the resultant value as the width of the road shoulder region. In a case in which the highly accurate map information contains information of the width of the road shoulder region, step S22 may be skipped, and this information may be used. In other words, the width of the road shoulder region is, for example, a width from a curb to a traffic lane on the road shoulder side of the first travel lane.

In step S22, information relating to existence of a road shoulder region and the type of a traffic lane between the road shoulder region and the travel road is acquired, and this information is reflected in the analysis list L. In the example in FIG. 5, "1" is set in the case in which a road shoulder region is present, whereas "0" is set in the case in which a road shoulder region is absent, for each point Px (Ps<Px<Pe). Moreover, "1" is set in a case in which the traffic lane is one line, that is, in a case in which it is possible for the vehicle to park and stop in the road shoulder region, whereas "0" is set for other types of traffic lanes. In addition, "–" is set for a place with no traffic lane for defining a road shoulder region. The same applies to FIG. 7A.

In step S23, evaluation of the width of the road shoulder region, which is hereinafter also referred to as "road shoulder width evaluation", is executed. FIGS. 5 and 7A show examples in which each point Px is evaluated by three stages of "A", "B", and "C", depending on the width of the road shoulder region. The evaluation "A" means that the width of the road shoulder region is "whole width of the vehicle+0.5 meters or more". The evaluation "B" means that the width of the road shoulder region is "whole width of the vehicle+ less than 0.5 meters". The evaluation "C" means that the width of the road shoulder region is "less than the whole width of the vehicle". The whole width of the vehicle is acquired from, for example, vehicle information relating to the own vehicle. The road shoulder region may be evaluated in consideration of the existence of the road shoulder region and the type of the traffic lane. In one example, as shown in rows of points Pn−2 to Pn in FIG. 5, in the case in which "0" is set with respect to the existence of the road shoulder region, or in the case in which "0" is set with respect to the type of the traffic lane, an evaluation value showing that the corresponding point is inappropriate as a stop location, e.g., "0", may be set as result of evaluation of the road shoulder region.

In step S24, the traffic restriction information, such as traffic control information and road structure information, is reflected in the analysis list. The traffic control information includes information such as of a distance to an intersection, a distance to a crosswalk or to a bicycle crossing zone, a distance to a branching road or to a merging road, a distance to a railroad crossing, a distance to a bus stop, existence of a road sign or a road marking for showing prohibition of parking and stopping, and a distance to a safe zone. The road structure information includes information such as of a gradient of a road, inside or outside of a tunnel, and inside or outside of a track lane area.

More specifically, for example, whether it is possible to set the point as an emergency stop location or an emergency stop space, is reflected in the analysis list L, in step S24. In one example, in the analysis list L, "1" is set in the case in which it is possible to set the point as an emergency stop location, whereas "0" is set in the case in which it is impossible to set the point as an emergency stop location, with respect to each point Px. In the example in FIG. 5, "1" is set for the point as a location that can be set as an emergency stop location in a case in which the point has a distance to an intersection of 5 meters or more, whereas "0" is set for the point as a location that cannot be set as an emergency stop location in a case in which the point has a distance to an intersection of less than 5 meters. Moreover, the evaluation value is set also for a distance to a crosswalk, in a similar manner.

In step S25, the state of the road shoulder at the time of executing this control process is evaluated. The method of evaluating the road shoulder is not specifically limited. However, for example, a combination of the static evaluation based on the road information, and the dynamic evaluation, is executed as the road shoulder evaluation. In other words, information described in the item of the static evaluation in the analysis list L is an example of the road information. The dynamic evaluation is based on, for example, vehicle surrounding information that is acquired from the information obtaining part 30 at the time an abnormality in the driver is detected. The dynamic evaluation includes evaluation relating to a quasi-dynamic obstacle, which is hereinafter referred to as a "quasi-movable body evaluation", and also includes evaluation relating to a dynamic obstacle, which is hereinafter referred to as a "movable body evaluation".

In the quasi-movable body evaluation, on-road obstacles such as on-road obstacles that stop moving, like a parked vehicle with the engine off, on-road obstacles that are temporarily set up, like a construction fence and a construction signboard, and on-road obstacles such as a utility pole, are evaluated. In other words, the quasi-dynamic obstacle to be evaluated in the quasi-movable body evaluation includes an on-road obstacle that is not reflected in the road information, and this on-road obstacle is a static body that exists at or around the time it is obtained by the information obtaining part 30. In the quasi-movable body evaluation, "1" is set in a case in which no on-road obstacle exists on the normal line between the travel path of the own vehicle H and the road shoulder region, whereas "0" is set in a case in which an on-road obstacle exists thereon. In one example, in a state in which a utility pole stands at a location "Q" and there is no other on-road obstacle in FIG. 4, "0" is set for a point P4 in the analysis list L1 in FIG. 5. In a case in which an evacuation path to the stop location is not set, for example, an on-road obstacle on the normal line is evaluated between a road shoulder region and a travel path to which the vehicle straightly advances from a current travel path.

The movable body evaluation is performed on an "on-road obstacle that is moving or on-road obstacle that is likely to move soon", such as a pedestrian, a vehicle that is traveling, or a vehicle that temporarily stops on the travel road due to, e.g., waiting for the traffic light. These on-road obstacles are collectively referred to as "dynamic obstacles". In the movable body evaluation, as in the case of the quasi-movable body evaluation, "1" is set in the case in which no on-road obstacle exists on the normal line between the travel path of the own vehicle H and the road shoulder region, whereas "0" is set in the case in which an on-road obstacle exists thereon. In addition, an on-road obstacle may move forward or rearward, and therefore, "0" is set also for several points P before and after the corresponding point P in the movable body evaluation. The number of the points P before and after the corresponding point P, for which "0" is set, is not specifically limited. For example, the number may be fixed or may be set on the basis of, e.g., the type of the on-road obstacle or the moving speed of the on-road obstacle estimated based on vehicle surrounding information from the information obtaining part 30.

The road shoulder evaluation yields an evaluation value based on result of multiplication of all set values of the static evaluation and the dynamic evaluation. In one example, in a state in which "0" is set in even one item among the items having "1" or "0", the evaluation value of the corresponding point P is "0". In the examples in FIGS. 4 and 5, as for a point P1, the evaluation value of the road shoulder width evaluation is "C", and the evaluation values of all other evaluation items are "1", whereby "C" is set as an evaluation value of the road shoulder evaluation. On the other hand, as for points P2 to P4, the evaluation value of the road shoulder width evaluation is "C", but the evaluation value of the movable body evaluation is "0", whereby "0" is set as an evaluation value of the road shoulder evaluation. Every point Px is subjected to the road shoulder evaluation in this manner, and "A" to "C" of the road shoulder width evaluation or "0" is set as an evaluation value. After the road shoulder evaluation of every point Px finishes, the analysis list L is stored in the storage 20, the processing in FIG. 2B finishes, and the control flow advances to step S30 in FIG. 2A, which is the processing in FIG. 2C.

The static evaluation in the analysis list L is executed only when the start point Ps and the end point Pe are set for the first time. On the other hand, the dynamic evaluation is updated at any time or at a predetermined time interval during traveling of the vehicle. The dynamic evaluation is updated, for example, in step S26 in FIG. 2A, which will be described later.

—Stop Location Setting Process—

In the processing in FIG. 2C, on the basis of the analysis list L generated in the process of analyzing the road shoulder region in step S20, searching for and setting an emergency stop location is executed as a stop location setting process.

In step 331, the analysis list L is read from the storage 20, and a region where the vehicle can be brought to an emergency stop, is extracted by using the analysis list L. This region is referred to as a "stoppable region", hereinafter. Specifically, for example, a road shoulder region having a predetermined width or greater and continuously having the predetermined width or greater for a predetermined distance or greater, is set as the stoppable region, among regions with the evaluation value of "A" to "C" in the analysis list. For example, the road shoulder region having the predetermined width or greater may be limited to the region having the evaluation value of "A" or "B", or may include all regions having the evaluation value of "A" to "C".

In the examples in FIGS. 4 and 5, regions having the evaluation value of "A" or "B" are set as the stoppable regions. In this case, a stoppable region R11, as shown in FIG. 4, is extracted in step S31. In the examples in FIGS. 6 and 7A, it is assumed that all regions having the evaluation value of "A" to "C" are included in the stoppable regions. In this case, stoppable regions R21 to R25, as shown in FIG. 6, are extracted in step S31. Note that the symbol "RN" represents a restricted region having traffic restriction, in FIGS. 4 and 6.

In step S32, it is determined that whether there is a stoppable region between the current location of the own vehicle H, or the start point Ps in the case in which the current location is before the start point Ps, and the end point Pe. In the example in FIG. 4, in which the stoppable region R11 is extracted, the determination results in YES in step S32, and the control flow advances to the next step S33. Also, in the example in FIG. 6, in which the stoppable regions R21 to R25 are extracted, the control flow advances to the next step S33, as in the case of FIG. 4.

In step S33, whether there are multiple stoppable regions is determined. In the case in which there is only one stoppable region, as in the example in FIG. 4, an emergency stop location is set in the stoppable region R11 in step S36, and the processing for setting the emergency stop location finishes. On the other hand, in the case in which there are multiple stoppable regions, as in the example in FIG. 6, the control flow advances to the next step S35.

In step S35, it is determined that whether the emergency stop location can be set on the basis of priority. In the example in FIG. 6, the evaluation value of "A", "B", or "C", is set in this order from a larger width road shoulder region, and the evaluation values of "A", "B", and "C" have higher priority in this order. In these conditions, in the example in FIG. 6, in which there are two stoppable regions having the evaluation value of "A", that is, the stoppable regions R22 and R24, as shown in FIG. 7A, the determination results in NO in step S35, and the control flow advances to step S38. In step S38, an emergency stop location is set in the stoppable region R22, because the stoppable region R22 is the closest region where the vehicle can stop at the time this control process is executed, among the stoppable regions having the same priority, which is the valuation value of "A" in this case. After the emergency stop location is set, the setting processing in FIG. 2C, that is, the processing in step S30 in FIG. 2A finishes.

On the other hand, in the case in which the determination results in YES in step S35, that is, in the case in which the emergency stop location can be set on the basis of the priority, an emergency stop location is set in the region having the highest priority, among the stoppable regions where the vehicle can stop.

In a case in which the stoppable region is sufficiently longer than the length of the own vehicle H, where to set the emergency stop location in the stoppable region, is not specifically limited. In one example, the emergency stop location is set at an entry side location in the stoppable region. After the emergency stop location is set, the setting processing in FIG. 2C, that is, the processing in step S30 in FIG. 2A finishes.

In the following descriptions, for convenience of explanation, the process for setting the emergency stop location by the stop location determining unit 131 is referred to as a "stop location setting process".

<<Destination Path Generator>>

The destination path generator 132 generates an evacuation path to the emergency stop location, which is set by the stop location determining unit 131. Specifically, the destination path generator 132 executes processing similar to the path generation performed by the path generator 116. Specifically, the destination path generator 132 generates multiple path candidates on the basis of output of the vehicle surrounding recognizing unit 111. On the basis of the path cost added to each of the multiple travel paths, the destination path generator 132 selects a travel path that is safe and shortest to the emergency stop location, from the multiple travel paths, as an evacuation path to the emergency stop location. The evacuation path to the emergency stop location is hereinafter simply referred to as an "evacuation path". The destination path generator 132 may generate an evacuation path on the basis of processing similar to that of the rule base controller 120, in order to secure more safety. The destination path generator 132 transmits the selected evacuation path to the vehicle movement determining unit 118.

<<Risk Calculator>>

The risk calculator 133 calculates, on the basis of vehicle surrounding information obtained by the information obtaining part 30, a collision risk that the own vehicle H collides with an on-road obstacle, in an evacuation path generating process, a decelerating process, a lane changing process, a first-travel-lane traveling process, and a stopping process. These processes will be described later. The on-road obstacle that is considered by the risk calculator 133 includes movable bodies such as an automatic four-wheel vehicle, a motorcycle, a bicycle, and a pedestrian, and static bodies such as a placed object that is temporarily placed due to construction work, and a parked vehicle. The collision risk that is calculated by the risk calculator 133 is transmitted to the stop location determining unit 131. Herein, among travel roads in the same direction, a travel lane adjacent to the road shoulder region R is referred to as a "first travel lane". A travel lane that is adjacent to the first travel lane and that is separated from the road shoulder region R more than the first travel lane, is referred to as a "second travel lane". A travel lane that is adjacent to the second travel lane and that is separated from the road shoulder region R more than the second travel lane, is referred to as a "third travel lane". That is, the travel roads include a first travel lane, a second travel lane, and a third travel lane that are lined in this order from the road shoulder region side. There may be only the first travel lane, or may be four or more travel lanes in the same direction.

The risk calculator 133 may calculate a collision risk value for collision risk by multiplying a first risk value and a second risk value together. The first risk value is set for a candidate of a location where the own vehicle H stops, which is hereinafter referred to as a "stop location candidate". The second risk value is set for movement of the own vehicle H until the own vehicle H reaches the stop location candidate. A specific method of calculating the collision risk value will be described later.

[Evacuation Traveling Control]

Next, an evacuation traveling control will be described with reference to FIGS. 2 and 3.

First, the evacuation traveling control will be overviewed. In the evacuation traveling control, in addition to the stop location setting process, an evacuation path generating process, a decelerating process, a lane changing process, and a first-travel-lane traveling process, and a stopping process are executed. The evacuation path generating process generates an evacuation path to the emergency stop location, which is set in the stop location setting process. The decelerating process decelerates the vehicle speed of the own vehicle H to a predetermined speed or lower. The lane changing process makes the vehicle change the lane to the first travel lane, on the basis of vehicle surrounding information obtained by the information obtaining part 30, when the own vehicle H travels in a lane other than the first travel lane in a case in which there are multiple travel lanes in the same direction. The first-travel-lane traveling process makes the own vehicle H travel at a predetermined speed or lower in the first travel lane. The stopping process makes the own vehicle H enter the stoppable region from the first travel lane and stop at the emergency stop location.

In the evacuation traveling control, the flows in FIGS. 2 and 3 are repeatedly executed until the own vehicle H stops at the emergency stop location. Note that the operation until step S30 in FIG. 2A is described in <<Stop Location Determining Unit>>, and therefore, the subsequent operation will be described herein.

<<Evacuation Traveling Control (1)>>

Figure 6:
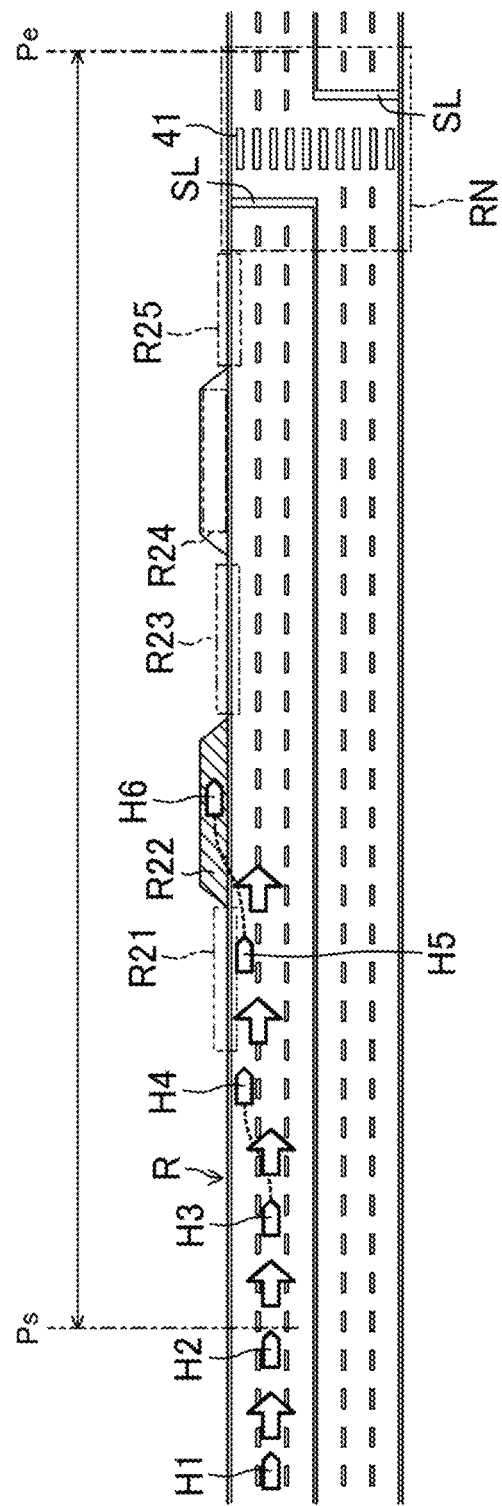
FIG. 6 is a schematic diagram showing an example of a travel scene of a vehicle that can stop at a first stop location candidate.

The following description assumes that an abnormality of a driver is detected while the own vehicle H travels in the travel scene in FIG. 6. That is, at the time of starting the control flow in FIG. 3A, a start point Ps and an end point Pe are already set at the locations shown in FIG. 6, and the analysis list L2 in FIG. 7A is already generated. In addition, the regions R21 to R25 (refer to FIG. 6) are extracted as stoppable regions, and an emergency stop location is set in the stoppable region R22.

Figure 3A:
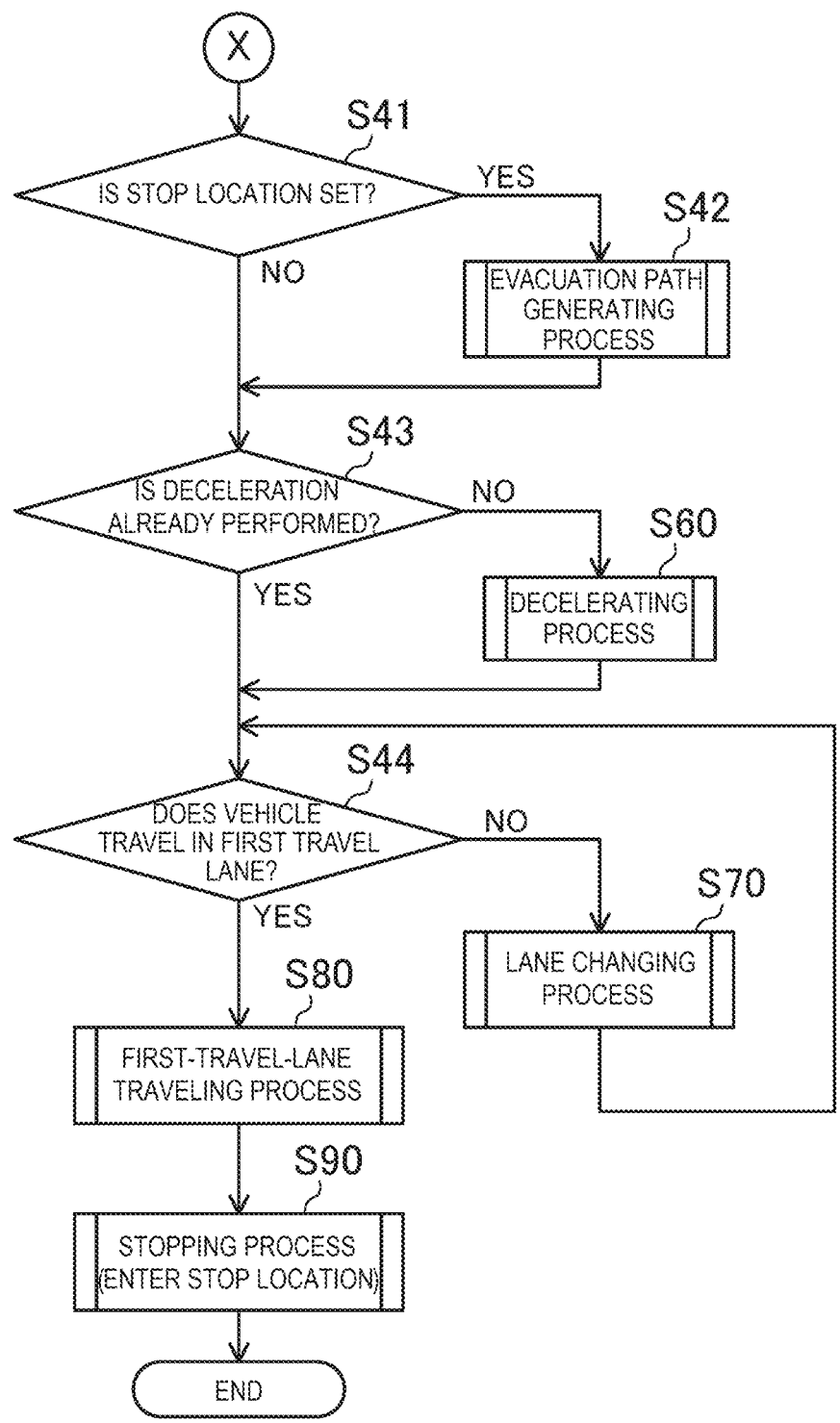
FIG. 3A is a flowchart showing a processing operation of a control section in bringing a vehicle to an emergency stop.

After the processing in step S30, that is, the stop location setting process is finished by the stop location determining unit 131, in FIG. 2A, the control flow advances to step S41 in FIG. 3A.

In step S41, the emergency stop control part 130 confirms whether a stop location is set. The stop location is set in a case in which a new emergency stop location is set, and, although detailed later, in a case in which an emergency stop location is changed or reset during traveling to the emergency stop location. The emergency stop location is already set in step S30 in FIG. 2. Thus, the determination results in YES in step S41, and the control flow advances to step S42.

—Evacuation Path Generating Process—

In step S42, an evacuation path to the emergency stop location, which is set by the stop location determining unit 131, is generated. Specifically, in the evacuation path generating process, the destination path generator 132 generates an evacuation path to the emergency stop location, which is set by the stop location determining unit 131. The method of generating the evacuation path is described in <<Destination Path Generator>>, and therefore, descriptions thereof are not repeated herein.

In the next step S43, the emergency stop control part 130 confirms whether the own vehicle H decelerates to a predetermined speed. As described above, the vehicle movement estimating unit 113 estimates the vehicle speed on the basis of output of the vehicle state sensor 34, for example, the vehicle speed sensor. In these conditions, the emergency stop control part 130 determines whether the own vehicle H decelerates to a predetermined speed, e.g., 10 km/h, on the basis of, e.g., the vehicle speed information of the own vehicle H, which is estimated by the vehicle movement estimating unit 113.

For example, in a case in which the vehicle speed is not decelerated to the predetermined speed, the determination results in NO in step S43, and the control flow advances to the "decelerating process" in step S60. In the example in FIG. 6, this situation corresponds to the time while the own vehicle H travels from the location H1 to the location H2.

—Decelerating Process—

FIG. 3B is a flowchart showing a processing operation of the decelerating process.

In the decelerating process, first, bringing the own vehicle H to an emergency stop is notified by using a notifying apparatus D, in step S61. The notifying apparatus D includes an optical notifying apparatus and a sound notifying apparatus. The optical notifying apparatus visually notifies the emergency stop by using light, like hazard lights. The sound notifying apparatus notifies the emergency stop by using a sound or a voice sound, like a horn or a speaker. Specifically, for example, the emergency stop control part 130 notifies that the own vehicle H is going to make an emergency stop or to decelerate, to, e.g., the surrounding other vehicle J, by emitting a sound through a horn and blinking hazard lights. Alternatively, bringing the own vehicle H to the emergency stop may be notified by using one of the optical notifying apparatus or the sound notifying apparatus, in step S61.

In parallel with the process in step S61, in step S62, the risk calculator 133 calculates a collision risk of execution of the decelerating process and a collision risk in the subsequent process, on the basis of vehicle surrounding information obtained by the information obtaining part 30. In one example, the risk calculator 133 acquires information of location and speed of other vehicle J that travels behind or obliquely behind the own vehicle H, on the basis of output of the camera 31, the radar 32, and/or the external communication section 36, and the risk calculator 133 calculates a risk that the other vehicle J collides with the own vehicle H when the own vehicle H decelerates.

In the next step S63, the emergency stop control part 130 determines whether the collision risk, which is calculated by the risk calculator 133, is a predetermined degree or higher. The method of evaluating the collision risk is not specifically limited. However, for example, the collision risk may be determined by the following method: (1) a location score is set in accordance with location of other vehicle J, a speed score is set in accordance with speed of the other vehicle J, and whether an integrated value of these scores is a predetermined collision score or higher is determined, or (2) travel simulation using, e.g., a vehicle model, is performed by the emergency stop control part 130.

For example, in a case in which no other vehicle J travels around the own vehicle H, as shown in FIG. 6, the collision risk is less than the predetermined degree, whereby the determination results in NO in step S63. Thus, the emergency stop control part 130 starts the deceleration control in step S64. The method of the deceleration control is not specifically limited. However, for example, the emergency stop control part 130 transmits a deceleration instruction signal for instructing deceleration to a predetermined speed, to the vehicle movement determining unit 118. Upon receiving the deceleration control signal, the vehicle movement determining unit 118 controls each actuator via the actuator control part 119 to decelerate the own vehicle H. In the case in which the decelerating processing finishes within a predetermined time period, the determination results in YES in the next step S65, and the emergency stop control part 130 finishes the decelerating process. In the example in FIG. 6, the decelerating process finishes when the own vehicle H is at the location H2, and the vehicle speed of the own vehicle H becomes the predetermined speed or lower. After the decelerating process finishes, the control flow advances to step S44 in FIG. 3A.

The risk calculation of the risk calculator 133 may be repeated in step S63 also after the emergency stop control part 130 starts the deceleration control, and in the case in which there is a collision risk of the predetermined degree or higher, the deceleration control may be temporarily stopped by an interrupt process, and the flow may return to step S63 and may then advance to step S68 in accordance with determination result of YES. The control in step S68 will be described later.

The processing returns to the flow in FIG. 3A, and, in step S44, the emergency stop control part 130 confirms whether the vehicle travels in the first travel lane. The emergency stop control part 130 confirms the travel lane of the own vehicle H, on the basis of, for example, location information of the vehicle measured by the location sensor 33 or image data of vehicle surroundings photographed by the camera 31. In the case in which the own vehicle H travels at the location H2 in FIG. 6, the determination results in NO in step S44, and the flow advances to the next step S45. In step S45, it is confirmed whether lane changing operation finishes, and the determination results in NO. Then, the control flow advances to the "lane changing process" in the next step S70.

—Lane Changing Process—

Figure 3C:
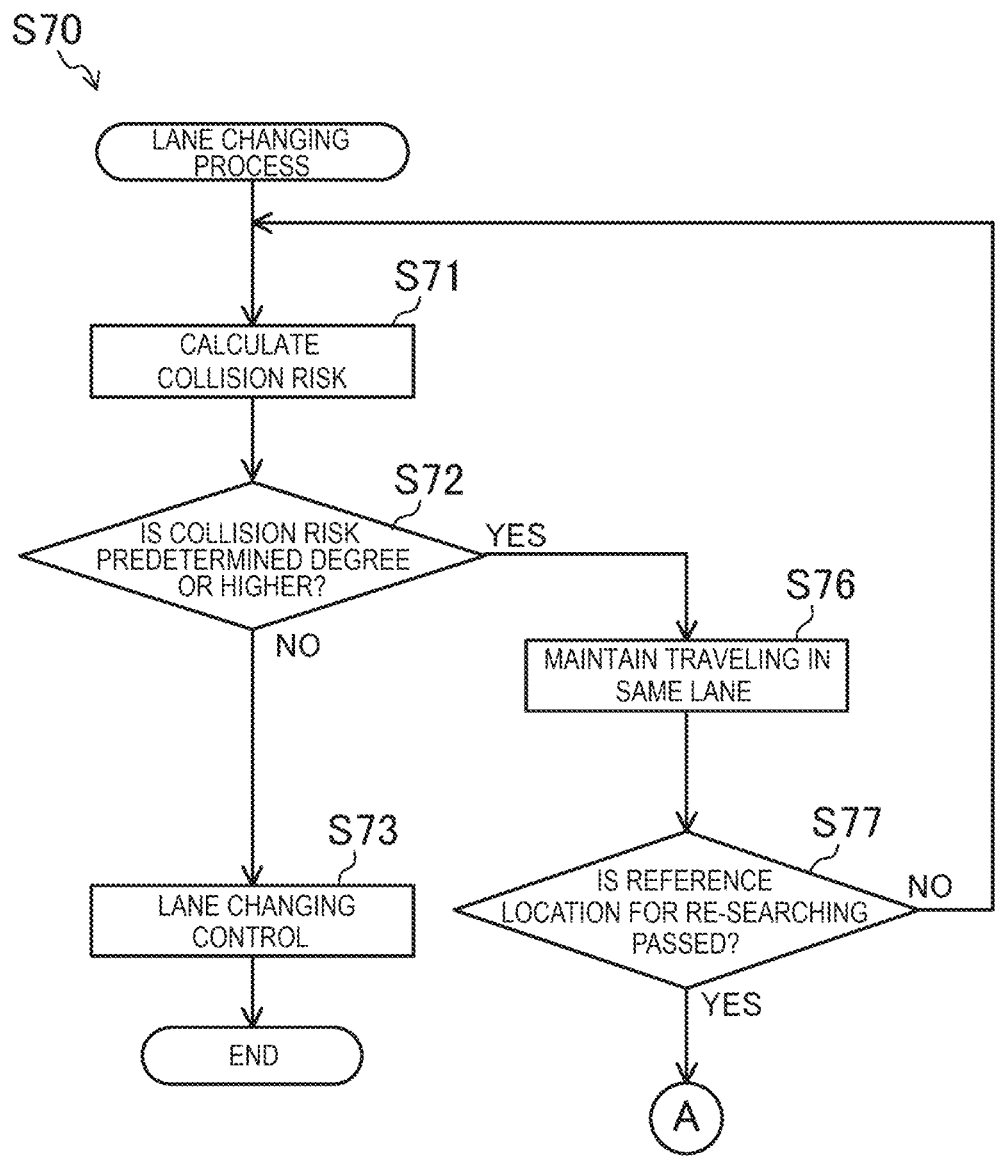
FIG. 3C is a flowchart showing a processing operation of a lane changing process.

FIG. 3C is a flowchart showing a processing operation of the lane changing process.

First, in step S71, the risk calculator 133 calculates a collision risk of execution of the lane changing process and a collision risk in the subsequent process, on the basis of vehicle surrounding information obtained by the information obtaining part 30. For example, the risk calculator 133 acquires information of location or speed of on-road obstacles, such as other vehicle J, in front of the own vehicle H and obliquely forward on a road shoulder side, obliquely rearward on a road shoulder side, and rearward of the own vehicle H, on the basis of output of the camera 31, the radar 32, and/or the external communication section 36. The risk calculator 133 then calculates a risk of collision with the other vehicle J when the own vehicle H changes the lane to a travel lane on a road shoulder region side.

In the next step S72, the emergency stop control part 130 determines whether the collision risk, which is calculated by the risk calculator 133, is the predetermined degree or higher. The method of evaluating the collision risk is not specifically limited, but, for example, a method similar to that for the "decelerating process" can be employed.

For example, in the case in which no other vehicle J travels around the own vehicle H, as shown in FIG. 6, the collision risk is less than the predetermined degree, whereby the determination results in NO in step S72. Thus, the emergency stop control part 130 starts lane changing control in step S73. The method of the lane changing control is not specifically limited. However, for example, the emergency stop control part 130 stops hazard lights from blinking but makes a direction indicator (not shown) on a road shoulder region side blink, while transmitting a lane change instruction signal for instructing change of the lane to the travel lane on the road shoulder region side, to the vehicle movement determining unit 118. Upon receiving the lane changing instruction signal, the vehicle movement determining unit 118 controls each actuator via the actuator control part 119 to make the own vehicle H change the lane. In the example in FIG. 6, the lane changing process finishes when the own vehicle H is at a location H4, and the own vehicle H starts traveling in the first travel lane at a predetermined vehicle speed or lower. After the lane changing process finishes, the control flow advances to step S80 in FIG. 3A.

—First-Travel-Lane Traveling Process and Stopping Process—

FIG. 3D is a flowchart showing processing operations of the first-travel-lane traveling process and the stopping process.

First, in steps S81 and S82, until the camera 31 recognizes the stoppable region R22, the emergency stop control part 130 makes the own vehicle H travel at a predetermined speed or lower, e.g., 10 km/h, in the first travel lane as well as, for example, makes hazard lights blink.

After the information obtaining part 30 recognizes the stoppable region R22 or the emergency stop location by, for example, the camera 31, the radar 32, and/or the external communication section 36, the determination results in YES in step S81, and the control flow advances to step S84.

In step S84, the risk calculator 133 calculates a collision risk in the stoppable region R22 or at the emergency stop location, which is recognized by the information obtaining part 30, such as the camera 31, the radar 32, and/or the external communication section 36. For example, the risk calculator 133 calculates a risk of collision with an on-road obstacle by checking existence of an on-road obstacle, such as a stopped other vehicle J, in the stoppable region R22 or at the emergency stop location, on the basis of output of the camera 31, the radar 32, and/or the external communication section 36.

In step S85, the emergency stop control part 130 confirms, on the basis of output of the camera 31, the radar 32, and/or the external communication section 36, whether the stoppable region R22 is a free space, that is, whether there is a risk of collision with an on-road obstacle when the own vehicle H enters the stoppable region R22. In the example in FIG. 6, the stoppable region R22 is recognized as a free space when the own vehicle H travels and reaches a location H5.

In this situation, the determination results in NO in step S85, and the emergency stop control part 130 makes the own vehicle H travel to a location in front of the stoppable region R22 in the first-travel-lane traveling process, in step S86. Also in the first-travel-lane traveling process, a collision risk of execution of the first-travel-lane traveling process and a collision risk in the subsequent stopping process may be calculated, on the basis of vehicle surrounding information obtained by the information obtaining part 30, as in the cases of the "decelerating process" and the "lane changing process". Then, in the case in which the collision risk is determined as being the predetermined degree or higher, the emergency stop control part 130 may execute a control in accordance with the situation, such as a control to make the own vehicle H stop at the current location.

In the next step S91, the risk calculator 133 calculates a collision risk in the first-travel-lane traveling process or the stopping process or in both, on the basis of vehicle surrounding information obtained by the information obtaining part 30. For example, the risk calculator 133 acquires information of location or speed of on-road obstacles, such as a bicycle and a pedestrian, in front of the own vehicle H and obliquely forward on a road shoulder side, obliquely rearward on a road shoulder side, and rearward of the own vehicle H, on the basis of output of the camera 31, the radar 32, and/or the external communication section 36. The risk calculator 133 then calculates a risk of collision with the on-road obstacle when the own vehicle H travels in the first travel lane or enters the stoppable region R22.

In the next step S92, the emergency stop control part 130 determines whether the collision risk, which is calculated by the risk calculator 133, is the predetermined degree or higher. The method of evaluating the collision risk is not specifically limited, but, for example, a method similar to that for the "decelerating process" can be employed.

For example, in the case in which there is no surrounding on-road obstacle and the stoppable region R22 is a free space, as shown in FIG. 6, the collision risk is less than the predetermined degree, whereby the determination results in NO in step S92. Thus, the emergency stop control part 130 starts control for making the own vehicle H enter the stoppable region R22 and stop at the emergency stop location in step S93. The method of the stopping control is not specifically limited. However, for example, the emergency stop control part 130 stops hazard lights from blinking but makes a direction indicator (not shown) on a road shoulder region side blink, while transmitting a stop instruction signal for instructing making the own vehicle H enter the stoppable region R22 and stop therein, to the vehicle movement determining unit 118. Upon receiving the stop instruction signal, the vehicle movement determining unit 118 controls each actuator via the actuator control part 119 to make the own vehicle H enter the stoppable region R22 and stop at the emergency stop location. After the own vehicle H stops at the emergency stop location, the evacuation traveling control finishes.

<<Evacuation Traveling Control (2)>>

Figure 8:
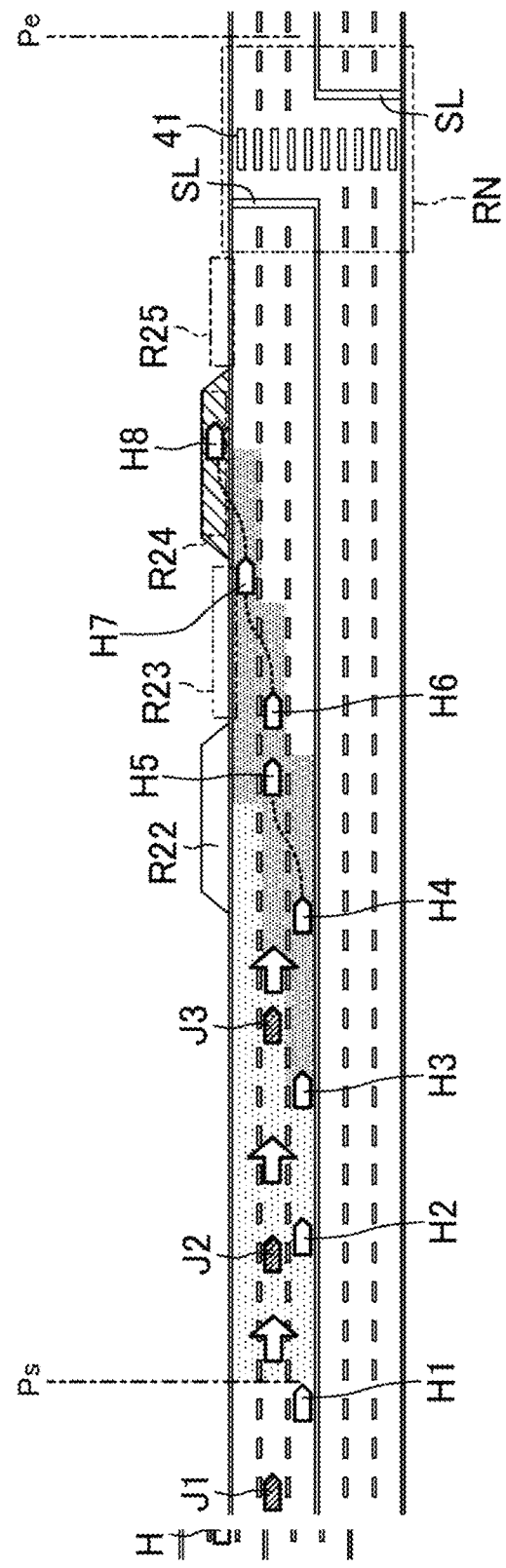
FIG. 8 is a schematic diagram showing an example of a travel scene of a vehicle that cannot stop at the first stop location candidate.

The following description assumes that an abnormality of a driver is detected while the own vehicle H travels in the travel scene in FIG. 8. As in the case of <<Evacuation Traveling Control (1)>>, at the time of starting the control flow in FIG. 3A, a start point Ps and an end point Pe are already set at the locations shown in FIG. 8, and the analysis list L2 in FIG. 7A is already generated. In addition, other vehicles Ja that stop in the stoppable region R22 are still not recognized at the time the own vehicle H travels at the location H1, and the other vehicles Ja are recognized only after the own vehicle H reaches the location H5.

Herein, descriptions are centered on the difference from <<Evacuation Traveling Control (1)>>, and descriptions of the same operations as those in <<Evacuation Traveling Control (1)>> may not be repeated depending on cases. For example, the operation that is performed until the vehicle H reaches the location H5, that is, the operation before step S80 in FIG. 3A is the same as that in <<Evacuation Traveling Control (1)>>. For this reason, operation that is performed immediately after the vehicle H travels to the location H5 and the control process in FIG. 3D starts, will be described herein.

—First-Travel-Lane Traveling Process and Stopping Process—

In the example in FIG. 8, the other vehicles Ja already stop in the stoppable region R22 when the stoppable region R22 is recognized and the determination results in YES in step S81, whereby the determination results in YES in step S85. That is, in response to entering the stoppable region R22, the emergency stop control part 130 determines the collision risk with respect to the other vehicles Ja, as being the predetermined degree or higher, whereby the emergency stop control part 130 interrupts the first-travel-lane traveling process but executes resetting of the stop location. Specifically, the emergency stop control part 130 interrupts the control process in FIG. 3D, and the control flow returns to step S13 in FIG. 2A.

—Stop Location Setting Process—

In FIG. 2A, the determination results in YES in step S13, and the determination results in NO in step S14, because the own vehicle H travels at the location H5 (refer to FIG. 8). The static evaluation of the road shoulder region is already executed in the initial flow, whereby the determination results in YES in step S16, and the control flow advances to step S26.

In step S26, the evaluation value relating to the dynamic evaluation for the quasi-dynamic obstacle and the dynamic obstacle, of a point Px ahead of the current location of the own vehicle H, and the comprehensive evaluation value of the road shoulder region in the right end column in FIG. 7A, are updated in the analysis list L. FIG. 7B shows an updated analysis list L2. In FIG. 7B, "0" is set for the region R22, as a result of evaluating the quasi-dynamic obstacle. This results in setting "0" for the region R22 as an evaluation value of the road shoulder evaluation. In this case, the evaluation values for the stoppable regions R23 to R25 and the restricted region RN, are not changed.

As described above, the static evaluation of the analysis list L is executed only when the start point Ps and the end point Pe are initially set, and in the case in which the process is interrupted, only the evaluation value relating to the dynamic evaluation is updated. This greatly reduces the calculation time in the case in which the process is interrupted during traveling.

After the analysis list is updated in step S26, searching for and setting an emergency stop location is executed in the next step S30 (refer to FIG. 2C). Note that the processing in each control process is the same as that described above, and therefore, the following descriptions are centered on result of the processing.

In step S31 in FIG. 2C, the regions R23 to R25 are extracted as the stoppable regions. As described above, the region R22, for which "0" is set as the evaluation value of the road shoulder evaluation, is not extracted as the stoppable region.

In steps S32 and S33, the determination results in YES because the stoppable regions R23 to R25 are extracted.

Herein, the stoppable region having a priority of "A" is only the stoppable region R24, as shown in FIG. 7B. Thus, in step S35, an emergency stop location can be set on the basis of the priority. Consequently, the determination results in YES in step S35, and a next emergency stop location is set in the stoppable region R24. After the setting processing in FIG. 2C finishes, the processing in step S30 in FIG. 2A finishes, and the control flow advances to the processing in FIG. 3A.

The emergency stop location is set in step S30 in FIG. 2, whereby the determination results in YES in step S41, and the control flow advances to the evacuation path generating process in step S42, in FIG. 3A.

—Evacuation Path Generating Process—

In step S42, the destination path generator 132 generates an evacuation path to the emergency stop location, which is set in the stoppable region R24.

—Decelerating Process—

The own vehicle H is already decelerated to the predetermined speed or lower. Thus, at this time, the determination results in YES in step S43, and the control flow advances to the next step S44, while the decelerating process is not executed.

—Lane Changing Process—

The own vehicle H already travels in the first travel lane. Thus, at this time, the determination results in YES in step S44, and the control flow advances to the next step S80, while the lane changing process is not executed.

—First-Travel-Lane Traveling Process and Stopping Process—

In steps S81 and S82, until the camera 31 recognizes the stoppable region R24, the emergency stop control part 130 makes the own vehicle H travel at a predetermined speed or lower, e.g., 10 km/h, in the first travel lane as well as, for example, makes hazard lights blink.

After the information obtaining part 30 recognizes the stoppable region R24 or the emergency stop location by, for example, the camera 31, the radar 32, and/or the external communication section 36, the determination results in YES in step S81, and the control flow advances to step S84.

At this time, the own vehicle H travels at a location H8. In addition, in the example in FIG. 8, the stoppable region R24 is recognized as a free space when the own vehicle H travels and reaches the location H8.

In this situation, the determination results in NO in step S85, and the emergency stop control part 130 makes the own vehicle H travel to a location in front of the stoppable region R24 in the first-travel-lane traveling process, in step S86.

Then, the risk calculator 133 calculates a collision risk in step S91, and the emergency stop control part 130 determines whether the collision risk is the predetermined degree or higher in step S92.

In the example in FIG. 8, in consideration of the stoppable region R24 being a free space, the determination results in NO in step S92. In response to this, the emergency stop control part 130 starts control for making the own vehicle H enter the stoppable region R24 and stop at the emergency stop location, and, after the own vehicle H stops at the emergency stop location, the evacuation traveling control finishes.

<<Evacuation Traveling Control (3)>>

The following description assumes that an abnormality of a driver is detected while the own vehicle H travels in the travel scene in FIG. 9. As in the case of <<Evacuation Traveling Control (2)>>, at the time of starting the control flow in FIG. 3A, a start point Ps and an end point Pe are already set at the locations shown in FIG. 9, and the analysis list L2 in FIG. 7A is already generated.

Herein, descriptions are centered on the difference from <<Evacuation Traveling Control (2)>>, and descriptions of the same operations as those in <<Evacuation Traveling Control (2)>> may not be repeated depending on cases. The location H1 of the own vehicle H in FIG. 9 corresponds to the location H2 in FIG. 6. That is, herein, the decelerating process in step S60 in FIG. 3A finishes, and operation from step S44 in FIG. 3A will be described. As shown in FIG. 9, at the time the own vehicle H is at the location H2, the own vehicle H travels in the third travel lane, and other vehicle J that is faster than the own vehicle H approaches the own vehicle H from rearward in the second travel lane.

The own vehicle H at the location H2 travels in the third travel lane. Thus, the determination results in NO in step S44 in FIG. 3A, and the control flow advances to the lane changing process in step S70.

—Lane Changing Process—

In step S71, the risk calculator 133 calculates a risk of collision with the other vehicle J, on the basis of vehicle surrounding information that is obtained by the information obtaining part 30 at the location H1. Herein, the other vehicle J approaches the own vehicle H at a speed faster than that of the own vehicle H, and therefore, the calculation result shows that the collision risk or the collision score with respect to the other vehicle J is the predetermined degree or higher. In response to this, the determination results in YES in the next step S72, and the control flow advances to step S76.

In step S76, instead of performing lane changing, traveling in the travel lane in which the own vehicle H has traveled, is continued, and the control flow advances to the next step S77.

In step S77, it is confirmed whether the own vehicle H passes through a reference location for re-searching. The reference location for re-searching is set based on a position in the travel lane, by which each process must be finished, in making a stop at the emergency stop location. The method of setting the reference location for re-searching is not specifically limited, but can use, for example, the following method: (1) a table based on location and vehicle speed of the own vehicle H is prepared, and the reference location is set based on this table, or (2) a calculation is performed internally by using, e.g., a vehicle model. In the examples in FIGS. 9 and 10A, the reference location for re-searching with respect to the stoppable region R22 is set in the region that is hatched with thin dots, and re-searching is performed when the own vehicle H goes beyond this region. Similarly, the reference location for re-searching with respect to the stoppable region R24 is set in the region that is hatched with thick dots, and re-searching is performed when the own vehicle H goes beyond this region. In these conditions, the determination results in NO in step S77, and the control flow advances to step S71. Thereafter, the own vehicle H travels and reaches the location H2, whereas the other vehicle J travels and reaches the location J2.

In step S71, the risk calculator 133 calculates a risk of collision with the other vehicle J, on the basis of vehicle surrounding information that is obtained by the information obtaining part 30 at the location H2. The calculation result shows that the collision risk or the collision score with respect to the other vehicle J at the location J2 is also the predetermined degree or higher, when the own vehicle H is at the location H2 as shown in FIG. 9. Thus, the determination results in YES in step S72 in the control flow. Thereafter, the own vehicle H travels and reaches the location H3, whereas the other vehicle J travels and reaches the location J3, in step S76. That is, the own vehicle H goes beyond the region that is hatched with the thin dots and enters the succeeding region that is hatched with the thick dots.

In this situation, the determination results in YES in step S77. Thus, the lane changing process is interrupted, and resetting of the stop location is executed. Specifically, the emergency stop control part 130 interrupts the control process in FIG. 3C, and the control flow returns to step S13 in FIG. 2A.

—Stop Location Setting Process—

In FIG. 2A, the determination results in YES in step S13, and the determination results in NO in step S14, because the own vehicle H travels at the location H3 (refer to FIG. 9). The static evaluation of the road shoulder region is already executed in the initial flow, whereby the determination results in YES in step S16, and the control flow advances to step S26.

In step S26, the evaluation value relating to the dynamic evaluation of a point Px ahead of the current location of the own vehicle H is updated in the analysis list L. FIG. 7C shows an updated analysis list L2. In FIG. 7C, the stoppable region R22 is excluded from the evaluation and is denoted by the symbol "–" although being ahead of the own vehicle H, and other evaluations are the same as those in FIG. 7B.

In the next step S30 (refer to FIG. 2C), searching for and setting an emergency stop location is executed. This setting process of the emergency stop location is similar to that in <<Evacuation Traveling Control (2)>>, and a next emergency stop location is set in the stoppable region R24.

—Evacuation Path Generating Process—

In step S42, the destination path generator 132 generates an evacuation path to the emergency stop location, which is set in the stoppable region R24.

—Decelerating Process—

The own vehicle H is already decelerated to the predetermined speed or lower. Thus, at this time, the determination results in YES in step S43, and the control flow advances to the next step S44, while the decelerating process is not executed.

—Lane Changing Process—

In step S71 in FIG. 3C, the risk calculator 133 calculates a risk of collision with the other vehicle J, on the basis of vehicle surrounding information that is obtained by the information obtaining part 30 at the location H3. Herein, the other vehicle J at the location J3 travels faster than the own vehicle H, obliquely forward of the own vehicle H at the location H3. In response to this, the calculation result shows that the collision risk or the collision score is less than the predetermined degree, at the location H3.

In this situation, the determination results in NO in step S72, and the emergency stop control part 130 makes the own vehicle H change from the third travel lane to the second travel lane (refer to the location from the location H4 to the location H5 in FIG. 9). After lane changing to the second travel lane finishes, the lane changing process in FIG. 3C is terminated for the present. Thereafter, the control flow returns to step S44 in FIG. 3A, and the determination results in NO, whereby the lane changing process is executed again, in order to change the lane from the second travel lane to the first travel lane, in step S70 (refer to the location from a location H6 to a location H7 in FIG. 9).

—First-Travel-Lane Traveling Process and Stopping Process—

Emergency stop in the stoppable region R24 is performed in a similar manner as in <<Evacuation Traveling Control (2)>>, and therefore, descriptions thereof are not repeated herein. After the own vehicle H stops at the emergency stop location in the stoppable region R24, the evacuation traveling control finishes.

<<Evacuation Traveling Control (4)>>

Figure 10A:
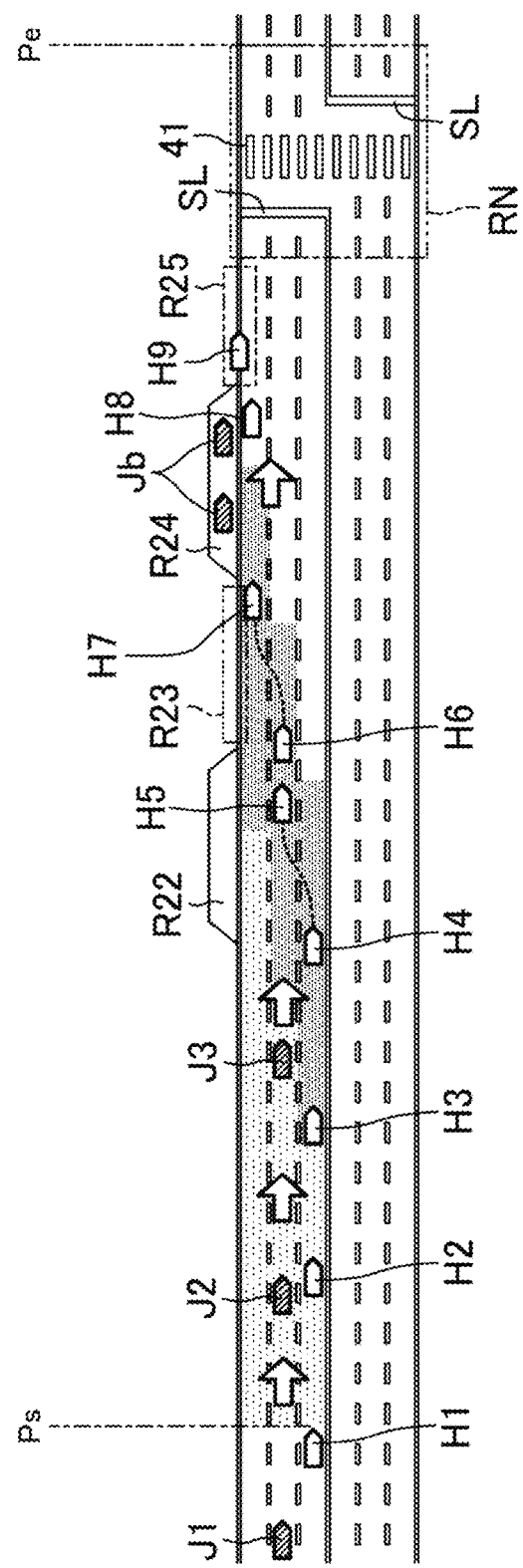
FIG. 10A is a schematic diagram showing an example of a travel scene of a vehicle that cannot stop at the first stop location candidate and at a second stop location candidate.

The following description assumes that an abnormality of a driver is detected while the own vehicle H travels in the travel scene in FIG. 10A. As in the case of <<Evacuation Traveling Control (3)>>, at the time of starting the control flow in FIG. 3A, a start point Ps and an end point Pe are already set at the locations shown in FIG. 10A, and the analysis list L2 in FIG. 7A is already generated.

Herein, descriptions are centered on the difference from <<Evacuation Traveling Control (3)>>, and descriptions of the same operations as those in <<Evacuation Traveling Control (3)>> may not be repeated depending on cases. For example, the operation that is performed until the own vehicle H reaches the location H7, that is, the operation before the "first-travel-lane traveling process and stopping process" start, is the same as that in <<Evacuation Traveling Control (1)>>. For this reason, operation that is performed immediately after the own vehicle H travels and reaches the location H7 and the control process in FIG. 3D starts, will be described herein. In addition, other vehicles Jb that stop in the stoppable region R24 are still not recognized while the own vehicle H travels at the location H6, and the other vehicles Jb are recognized only after the own vehicle H reaches the location H7.

—First-Travel-Lane Traveling Process and Stopping Process—

In the example in FIG. 10A, the stoppable region R24 is recognized, and the determination results in YES in step S81, when the own vehicle H reaches the location H7. Then, in consideration of the other vehicles Jb stopping in the stoppable region R24, the determination results in YES in step S85. That is, in response to entering the stoppable region R24, the emergency stop control part 130 determines the collision risk with respect to the other vehicles Jb, as being the predetermined degree or higher, whereby the emergency stop control part 130 interrupts the first-travel-lane traveling process but executes resetting of the stop location. Specifically, the emergency stop control part 130 interrupts the control process in FIG. 3D, and the control flow returns to step S13 in FIG. 2A.

—Stop Location Setting Process—

In FIG. 2A, the determination results in YES in step S13, and the determination results in NO in step S14, because the own vehicle H travels at the location H7. The static evaluation of the road shoulder region is already executed in the initial flow, whereby the determination results in YES in step S16, and the control flow advances to step S26.

In step S26, the evaluation value relating to the dynamic evaluation of a point Px ahead of the current location of the own vehicle H is updated in the analysis list L. FIG. 7D shows an updated analysis list L2. In FIG. 7D, "0" is set for the region R24, as a result of evaluating the quasi-dynamic obstacle. This results in setting "0" for the region R24 as an evaluation value of the road shoulder evaluation. In this case, the evaluation values of the stoppable region R25 and the restricted region RN are not changed.

In the next step S30 (refer to FIG. 2C), searching for and setting an emergency stop location is executed.

In step S31 in FIG. 2C, only the region R25 is extracted as the stoppable region. As described above, the region R24, for which "0" is set as the evaluation value of the road shoulder evaluation, is not extracted as the stoppable region.

In view of extracting only the stoppable region R25, the determination results in YES in step S32, and the determination results in NO in step S33. Then, in the next step S36, an emergency stop location is set in the stoppable region R25, and the stop location setting process finishes.

—Evacuation Path Generating Process—

In step S42, the destination path generator 132 generates an evacuation path to the emergency stop location, which is set in the stoppable region R25.

—Decelerating Process—

The own vehicle H is already decelerated to the predetermined speed or lower. Thus, at this time, the determination results in YES in step S43, and the control flow advances to the next step S44, while the decelerating process is not executed.

—Lane Changing Process—

The own vehicle H already travels in the first travel lane. Thus, at this time, the determination results in YES in step S44, and the control flow advances to the next step S80, while the lane changing process is not executed.

—First-Travel-Lane Traveling Process and Stopping Process—

Figure 10B:
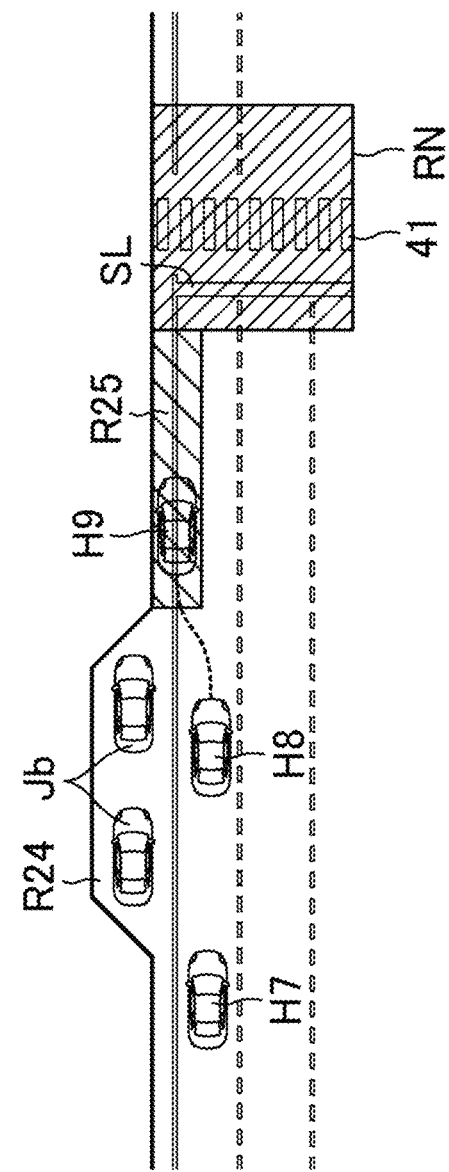
FIG. 10B is an enlarged diagram of the vicinity of emergency stop locations in FIG. 10A.

Emergency stop in the stoppable region R25 is performed in a manner substantially the same as that in making a stop in the stoppable region R24 in <<Evacuation Traveling Control (3)>>, and therefore, descriptions thereof are omitted herein. After the own vehicle H stops at the emergency stop location in the stoppable region R25 as shown in FIG. 10B, the evacuation traveling control finishes.

As described above, in this embodiment, the control section 100 of the vehicle control apparatus 10 is configured to, in bringing a vehicle to an emergency stop, execute the stop location setting process, the evacuation path generating process, the decelerating process, the lane changing process, the first-travel-lane traveling process, and the stopping process. The stop location setting process sets a stop location at which the vehicle is to stop, on the basis of information of a road shoulder region R stored in the storage 20. The evacuation path generating process generates an evacuation path to the stop location. The decelerating process decelerates the speed of the vehicle to a predetermined speed or lower. The lane changing process makes the vehicle change from the second travel lane to a free space of the first travel lane on the basis of vehicle surrounding information. The first-travel-lane traveling process makes the vehicle travel at the predetermined speed or lower in the first travel lane. The stopping process makes the vehicle enter the stop location from the first travel lane and stop thereat. The control section 100 calculates a collision risk of collision with an obstacle on a road, on the basis of vehicle surrounding information obtained by the information obtaining part 30. In the case in which the collision risk is a predetermined degree or higher in the process, the control section 100 interrupts the corresponding process and sets a stop location in order to execute the operation in the process subsequent to the interrupted process.

Thus, the process in which the collision risk of collision with an obstacle on a road is the predetermined degree or higher, is interrupted, and a stop location is set in order to execute the operation in the process subsequent to the interrupted process. This enables changing to a stop location and an evacuation path by the use of which an emergency stop is safely performed, before the collision risk is actualized due to change in traffic flow after the evacuation path to the emergency stop location is once set.

<<Evacuation Traveling Control (5)>>

Figure 11:
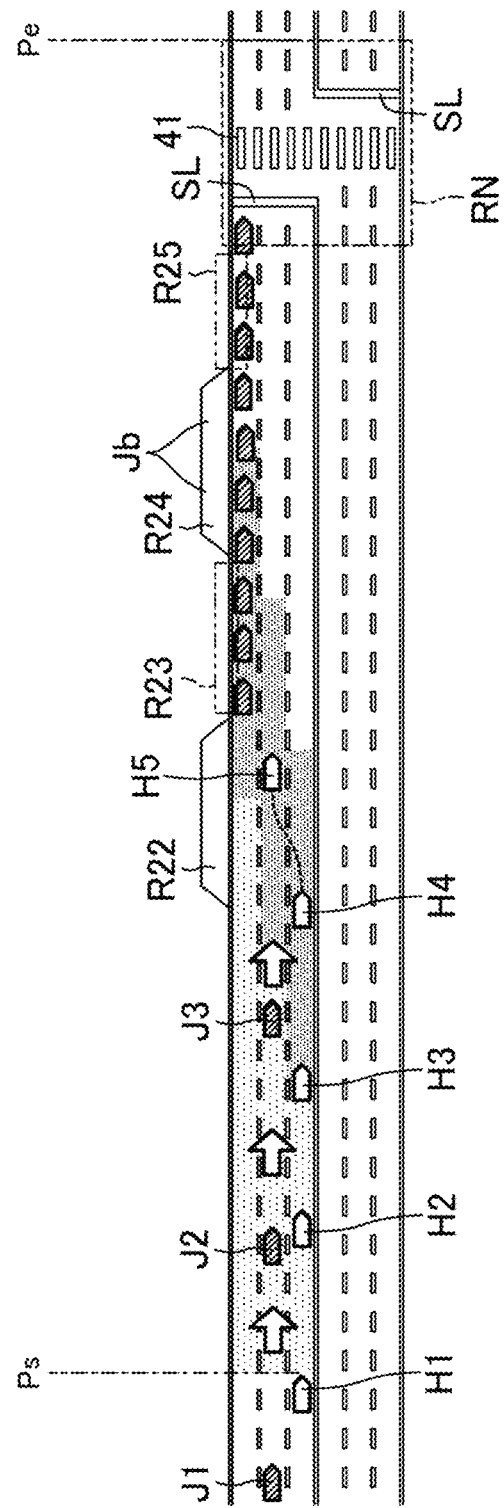
FIG. 11 is a schematic diagram showing an example of a travel scene of a vehicle that cannot stop in a road shoulder region.

The following description assumes that an abnormality of a driver is detected while the own vehicle H travels in the travel scene in FIG. 11. As in the case of <<Evacuation Traveling Control (3)>>, at the time of starting the control flow in FIG. 3A, a start point Ps and an end point Pe are already set at the locations shown in FIG. 11, and the analysis list L2 in FIG. 7A is already generated.

In FIG. 11, as in the case in FIG. 9, the own vehicle H travels at the location H2 in the third travel lane, and other vehicle J that is faster than the own vehicle H approaches the own vehicle H from rearward in the second travel lane. That is, the control process in the lane changing process in FIG. 3C is interrupted, and the control flow returns to step S13 in FIG. 2A, while the vehicle travels from the location H2 to the location H3. The subsequent control in this situation in FIG. 11 will be described.

In addition, in FIG. 11, traffic congestion extending from a location in front of a crosswalk to the stoppable region R23, occurs in the first travel lane. That is, congested vehicles Jb prevent stopping in the stoppable regions R23, R24, and R25. The own vehicle H recognizes the congested vehicles Jb when traveling from the location H2 to the location H3.

—Stop Location Setting Process—

As described above, the own vehicle H travels from the location H2 to the location H3 (refer to FIG. 11) when the control process returns to step S13 in FIG. 2A. Thus, the determination results in YES in step S13, and the determination results in NO in step S14. The static evaluation of the road shoulder region is already executed in the initial flow, whereby the determination results in YES in step S16, and the control flow advances to step S26.

In step S26, the evaluation value relating to the dynamic evaluation of a point Px ahead of the current location of the own vehicle H is updated in the analysis list L. FIG. 7E shows an updated analysis list L2. In FIG. 7E, as in the case in FIG. 7C, the stoppable region R22 is excluded from the evaluation and is denoted by the symbol "–". In addition, due to the congested vehicles Jb, "0" is set for the positions corresponding to the stoppable regions R23 to R25, as the evaluation value of the movable body evaluation. This results in setting "0" for all of the stoppable regions R22 to R25 as an evaluation value of the road shoulder evaluation.

In the next step S30 (refer to FIG. 2C), searching for and setting an emergency stop location is executed. In step S31 in FIG. 2C, the analysis list L2 in FIG. 7E is read from the storage 20. As described above, all of the stoppable regions R22 to R25 have an evaluation value of the road shoulder evaluation of "0". Thus, the determination results in NO in the next step S32, and the control flow advances to step S90. In other words, in view of possibility that the own vehicle H collides with the other vehicle when being evacuated toward the road shoulder region, the emergency stop control part 130 does not generate an evacuation path to the road shoulder region, but executes a travel lane stopping process for making the own vehicle H stop in the travel lane, before the end point Pe, in step S99.

—Travel Lane Stopping Process—

In step S99, the emergency stop control part 130 makes the own vehicle H stop in the travel lane. The method of determining the lane in which the own vehicle H is to stop, and the method of determining a stop location in the selected travel lane, are not specifically limited.

In one example, at the time stopping in the road shoulder region proves to be impracticable, the rearward traffic conditions may be checked, and the own vehicle H may be made to decelerate and stop immediately at the current location in a case in which a risk of collision with the other vehicle J is low. Alternatively, for example, the own vehicle H may be controlled to move to a travel lane as close to the road shoulder region R as possible and to stop therein, before reaching the end point Pe. In another example, an index for quantitatively evaluating the collision risk may be provided, and a stop lane and a stop location may be determined on the basis of this index. The index may use, for example, a collision risk value that is calculated by multiplying a first risk value and a second risk value together by the risk calculator 133. The first risk value and the second risk value will be specifically described below.

The emergency stop control part 130 sets multiple stop location candidates in a free space existing before the end point Pe. The risk calculator 133 calculates the collision risk value with respect to each of the stop location candidates. Then, the emergency stop control part 130 determines the stop location candidate having a low collision risk value, which is calculated by the risk calculator 133, as the stop location.

(Calculation of Collision Risk Value)

Herein, an example of calculating a collision risk value from the product of the first risk value and the second risk value, will be described. As described above, the first risk value is set for the stop location candidate, and the second risk value is set for the movement of the own vehicle H until the own vehicle H reaches the stop location candidate.

FIG. 12 is a table showing examples of the first risk value. Herein, the first risk value is set lowest for a parking space, as shown in FIG. 12. A road shoulder region has a risk value equal to or higher than that for the parking space, depending on an extra space in width of the road shoulder region relative to the vehicle width. The first risk value is basically set lower as the location is relatively closer to the road shoulder region. That is, for example, in a case in which there are multiple travel lanes in an ordinary road, the first risk value is set lower in a relatively leftward travel lane, e.g., the first travel lane, than in a relatively rightward travel lane, e.g., the second travel lane. The first risk value for the inside of an intersection is set so as to yield an upper limit threshold or higher when the product of the first risk value and the smallest second risk value is obtained, in order to avoid setting a final stop location within the intersection, in principle. The parking space includes an emergency evaluation space and a parking space of a store.

FIG. 13 is a table showing examples of the second risk value. The second risk value is set lowest in the case in which the own vehicle H continues traveling without changing the vehicle speed in the current travel lane, as shown in FIG. 4. The movement having the next lowest risk value is deceleration in the same travel lane. The reason for this is that a collision risk of the own vehicle H with respect to a rearward vehicle is slightly increased by deceleration, more than that in the case of making the own vehicle H continue traveling at the same speed. Thus, the second risk value for deceleration in the same travel lane is set higher than that for traveling at the same speed in the same travel lane. For the case in which the own vehicle H passes through a crosswalk or an intersection, the second risk value is set relatively high. This is because there is a possibility of collision with a pedestrian or other vehicle in an intersection or a crosswalk. From a similar point of view, the second risk value is set relatively higher for a case of turning left or right at an intersection than for a case of straightly advancing an intersection. The risk calculator 133 calculates the collision risk value in consideration of the second risk value of every movement of the own vehicle H until the own vehicle H reaches the stop location candidate.

The first risk values shown in FIG. 12 and the second risk values shown in FIG. 13 are examples, and they can be freely set. In addition, an upper limit reference value may be set for the collision risk value, and a stop location may not be set at a location having a collision risk value exceeding the upper limit threshold, although the location is a free space. The upper limit threshold may be set to "60", for example.

Next, a specific example of calculation of the collision risk value will be described.

In one example, a parking space that is reached after a vehicle straightly advances and passes through a crosswalk, is provided on a road shoulder region side of the first travel lane. This parking space is set as a first stop location candidate of a vehicle in the third travel lane. In this situation, the own vehicle H decelerates and changes from the third travel lane to the first travel lane, and then, the own vehicle H passes through the crosswalk and enters the parking space to make a stop. In this case, the second risk value is 1.5×2×2×20=120. The first risk value of the parking space is "1". As a result, the collision risk value for the first stop location candidate is 120×1=120.

In another example, a vehicle that travels in the third travel lane changes the lane to the first travel lane and stops at a second stop location candidate in the first travel lane. The second risk value of this case is 1.5×2×2=6, due to twice lane changing. The first risk value of the first travel lane is "5". Thus, the collision risk value for the second stop location candidate is 6×5=30.

In yet another example, a vehicle that travels in the third travel lane stops at a third stop location candidate in the third travel lane without changing lanes. The second risk value of this case is "1.5". The first risk value of the third travel lane is "30". Thus, the collision risk value for the third stop location candidate is 1.5×30=45.

For example, in a case in which the first stop location candidate to the third stop location candidate are recognized as free spaces where an emergency stop can be made, the emergency stop control part 130 determines the second stop location candidate as the emergency stop location.

Next, the travel scene in FIG. 11 will be described.

In the situation in FIG. 11, the emergency stop control part 130 searches for a free space in the travel lane on the basis of vehicle surrounding information obtained by the information obtaining part 30, for example, the camera 31, the radar 32, and/or the external communication section 36. Herein, the own vehicle H travels at the location H3, and the second travel lane and the third travel lane are recognized as free spaces.

In these conditions, the risk calculator 133 calculates a collision risk value for a case in which the own vehicle H stops in the third travel lane without changing the lane and calculates a collision risk value for a case in which the own vehicle H changes the lane to the second travel lane and stops therein.

In the case in which the own vehicle H stops in the third travel lane without changing the lane, the first risk value is "30" (refer to FIG. 12). In consideration of the own vehicle H stopping in the same traffic lane, the second risk value is "1" (refer to FIG. 13). As a result, the collision risk value for the stop location candidate is 30×1=30.

In the case in which the own vehicle H changes the lane to the second travel lane and stops therein, the first risk value is "10" due to stopping in the second travel lane. The lane changing is performed once, and thus, the second risk value is "2". As a result, the collision risk value for the stop location candidate is 10×2=20.

The emergency stop control part 130 sets the second travel lane as the emergency stop location in response to result of calculation performed by the risk calculator 133. Then, as in the cases in FIGS. 9 and 10A, the emergency stop control part 130 makes the own vehicle H move from the location H4 to the location H5 to change from the third travel lane to the second travel lane and then makes the own vehicle H stop after the lane changing finishes.

As described above, in <<Evacuation Traveling Control (5)>>, the emergency stop control part 130 calculates a collision risk with respect to an on-road obstacle on the basis of vehicle surrounding information obtained by the information obtaining part 30, for example, the camera 31, the radar 32, and/or the external communication section 36, in the evacuation traveling control for making the own vehicle H evacuate to the road shoulder region R. Thereafter, the emergency stop control part 130 interrupts the evacuation path generating process and makes the own vehicle H stop in the travel lane in the case in which the collision risk is the predetermined degree or higher. This avoids elongation of time to bring the vehicle to an emergency stop.

The following description relates to a computer environment in which embodiments of the present disclosure may be implemented. This environment may include an embedded computer environment, local multi-processor embodiment, remote (e.g., cloud-based) environment, or a mixture of all the environments.

FIG. 14 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 14 is a functional block diagram illustrating a networked system 800 of one or more networked computers and servers. In an embodiment, the hardware and software environment illustrated in FIG. 14 may provide an exemplary platform for implementation of the software and/or methods according to the present disclosure.

Referring to FIG. 14, a networked system 800 may include, but is not limited to, computer 805, network 810, remote computer 815, web server 820, cloud storage server 825 and computer server 830. In some embodiments, multiple instances of one or more of the functional blocks illustrated in FIG. 8 may be employed.

Additional detail of computer 805 is shown in FIG. 14. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be built into the automobile, a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include input devices, e.g., any or all of the devices in the information acquisition means 10 and/or other suitable input devices, and output devices, e.g., any or all of the various actuator devices AC and/or other suitable output devices, e.g., a speaker. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870, e.g., a head-up display or a screen of a car navigation system. Display 870 may be used, in some embodiments, to present a command line or graphical user interface to a user of computer 805. Display interface 865 may connect to display 870 using one or more proprietary or industry standard connections, such as VGA, DVI, Display-Port and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

The embodiments are described above by way of example only and are not intended to limit the scope of this disclosure. The scope of this disclosure is defined by the claims, and modifications and alterations belonging to the scope equivalent to the scope of the claims all fall within the scope of this disclosure.

The technique disclosed herein is useful for a vehicle travel control apparatus including a travel control part. The travel control part generates a target path to a target location on the basis of vehicle surrounding information and controls a vehicle so that the vehicle will follow the target path.

The invention claimed is:

1. A travel control apparatus for a vehicle, comprising:
circuitry configured to:
search for a stop location where the vehicle is to stop, on a basis of road shoulder region information;
generate an evacuation path to the stop location on a basis of road information;
guide the vehicle to the stop location from a first travel lane adjacent to a road shoulder region;
calculate a collision risk of collision with an obstacle on a road on a basis of vehicle surrounding information by multiplying a first risk value and a second risk value together, the first risk value being set for a stop location candidate, and the second risk value being set for movement of the vehicle until the vehicle reaches the stop location candidate; and
on a condition that the collision risk is a predetermined degree or higher, interrupt the guidance, or, otherwise, guide the vehicle to enter the stop location and stop the vehicle at the stop location.

2. The travel control apparatus of claim 1, wherein the circuitry is further configured to decelerate the vehicle to a predetermined speed or lower while the vehicle is traveling along the evacuation path.

3. The travel control apparatus of claim 2, wherein the circuitry is configured to reevaluate a collision risk due to deceleration of the vehicle, on a condition that the reevaluated collision risk is the predetermined degree or higher, interrupt the deceleration.

4. The travel control apparatus of claim 1, wherein the circuitry is further configured to interrupt the guidance by stopping the vehicle in a current travel lane.

5. The travel control apparatus of claim 1, wherein the circuitry is further configured to interrupt the guidance by setting a new stop location.

6. The travel control apparatus of claim 1, wherein the circuitry is further configured to interrupt the guidance by researching a new stop location.

7. The travel control apparatus according to claim 1, wherein the circuitry is configured to:
on a condition that an abnormality in physical condition of a driver of the vehicle is detected, limit at least one of an elapsed time or a travel distance after the detection of the abnormality in physical condition, in accordance with a degree of the abnormality in physical condition; and
set the stop location within the limit.

8. The travel control apparatus according to claim 7, wherein the circuitry is configured to:
extract a region of the road shoulder region having a width and a length of predetermined reference values or greater as a stoppable region, on the basis of the road shoulder region information; and on a condition that there are multiple stoppable regions, set priorities to the stoppable regions depending on an area of the stoppable regions, and set a highly prioritized stoppable region as the stop location.

9. The travel control apparatus according to claim 1, wherein, on a condition that there are multiple travel lanes, the first risk value is set lower for a travel lane relatively close to the road shoulder region than for a travel lane relatively distant from the road shoulder region.

10. The travel control apparatus according to claim 1, wherein the circuitry is configured to stop the vehicle at the road shoulder region before a location the vehicle would reach by traveling for a predetermined time or a predetermined distance in the evacuation path.

11. The travel control apparatus according to claim 1, on a condition that the vehicle travels in a second travel lane that is separated from the road shoulder region more than the first travel lane, the circuitry is configured to guide the vehicle from the second travel lane to a free space of the first travel lane, on the basis of the vehicle surrounding information.

12. The travel control apparatus of claim 11, wherein the circuitry is further configured to decelerate the vehicle to a predetermined speed or lower while the vehicle is traveling along the evacuation path.

13. The travel control apparatus of claim 12, wherein the circuitry is configured to, on a condition that the collision risk is a predetermined degree or higher due to deceleration of the vehicle, interrupt the deceleration.

14. The travel control apparatus according to claim 1, wherein the road information includes information relating to a width of the road shoulder region.

15. The travel control apparatus of claim 14, wherein the circuitry is further configured to interrupt the guidance by stopping the vehicle in a current travel lane.

16. The travel control apparatus according to claim 1, wherein the circuitry is further configured to generate a target path to a target location on a basis of the vehicle surrounding information and control the vehicle to follow the target path.

17. A method of controlling a vehicle, the method comprising:

searching for a stop location where the vehicle is to stop, on a basis of road shoulder region information;

generating an evacuation path to the stop location on a basis of road information;

guiding the vehicle to the stop location from a first travel lane adjacent to a road shoulder region;

calculating a collision risk of collision with an obstacle on a road on a basis of vehicle surrounding information by multiplying a first risk value and a second risk value together, the first risk value being set for a stop location candidate, and the second risk value being set for movement of the vehicle until the vehicle reaches the stop location candidate; and on a condition that the collision risk is a predetermined degree or higher, interrupting the guidance, or, otherwise, guiding the vehicle to enter the stop location and stopping the vehicle at the stop location.

18. A non-transitory computer readable storage including computer readable instructions that when executed by a controller cause the controller to execute a method of controlling a vehicle, the method comprising:

searching for a stop location where the vehicle is to stop, on a basis of road shoulder region information;

generating an evacuation path to the stop location on a basis of road information;

guiding the vehicle to the stop location from a first travel lane adjacent to a road shoulder region;

calculating a collision risk of collision with an obstacle on a road on a basis of vehicle surrounding information by multiplying a first risk value and a second risk value together, the first risk value being set for a stop location candidate, and the second risk value being set for movement of the vehicle until the vehicle reaches the stop location candidate; and on a condition that the collision risk is a predetermined degree or higher, interrupting the guidance, or, otherwise, guiding the vehicle to enter the stop location and stopping the vehicle at the stop location.

* * * * *